United States Patent [19]

Moriwaki et al.

[11] Patent Number: 5,737,046
[45] Date of Patent: Apr. 7, 1998

[54] BIREFRINGENCE CONTROL TYPE LIQUID CRYSTAL DISPLAY DEVICE

[75] Inventors: Hiroyuki Moriwaki; Manabu Abiru; Koji Yabuta, all of Nara; Nobuhiro Kasai, Yamatokoriyama, all of Japan

[73] Assignee: Sharp Kabushiki Kaisha, Osaka, Japan

[21] Appl. No.: 695,420

[22] Filed: Aug. 12, 1996

[30] Foreign Application Priority Data

Oct. 13, 1995 [JP] Japan .................................. 7-265378
Mar. 1, 1996 [JP] Japan .................................. 8-044563

[51] Int. Cl.$^6$ .................................................. G02F 1/1335
[52] U.S. Cl. ................................. 349/117; 349/121
[58] Field of Search .................................. 349/117, 118, 349/119, 120, 121

[56] References Cited

U.S. PATENT DOCUMENTS

| | | | |
|---|---|---|---|
| 5,175,638 | 12/1992 | Kanemoto et al. | 349/121 |
| 5,212,819 | 5/1993 | Wada | 349/117 |
| 5,311,340 | 5/1994 | Murata et al. | 349/119 |
| 5,513,026 | 4/1996 | Suzuki et al. | 349/155 |
| 5,583,677 | 12/1996 | Ito et al. | 349/118 |
| 5,594,591 | 1/1997 | Yamamoto et al. | 349/117 |
| 5,619,356 | 4/1997 | Kozo et al. | 349/117 |
| 5,638,200 | 6/1997 | Xu | 349/117 |

FOREIGN PATENT DOCUMENTS

| | | | |
|---|---|---|---|
| 1-216318 | 8/1989 | Japan | 349/117 |
| 2-118516 | 5/1990 | Japan | |
| 3-155522 | 7/1991 | Japan | 349/119 |
| 6-175125 | 6/1994 | Japan | |
| 7-5457 | 1/1995 | Japan | |

*Primary Examiner*—William L. Sikes
*Assistant Examiner*—Tiep H. Nguyen
*Attorney, Agent, or Firm*—David G. Conlin; George W. Neuner

[57] ABSTRACT

It is an object of the invention to display white and black colors simultaneously in addition to a color display, in a birefringence control type liquid crystal display device using a high polymer film in optical compensation plate. In the birefringence control type liquid crystal display device using a high polymer film in the optical compensation plate, the product $d\Delta n$ of a cell gap $d$ and a refractive index anisotropy $\Delta n$ of the liquid crystal cell is set in a range of 1700 nm to 1950 nm, the difference ($d\Delta n - d_R n_R$) of the $d\Delta n$ of the liquid crystal cell and the product $d_R \Delta n_R$ of a refractive index anisotropy $\Delta n_R$ and a film thickness $d_R$ of the phase difference plate is set in a range of 750 nm to 850 nm, the crossing angle of the orientation direction of the upper side of the liquid crystal layer and the slow axis of the phase difference plate is set in a range of 80° to 100°, the crossing angle of the absorption axes of the upper and lower polarizers is set in a range of 50° to 70°, and the crossing angle of the absorption axis of each polarizer and the orientation direction of liquid crystal molecules adjacent thereto is set in a range of 30° to 50°.

8 Claims, 18 Drawing Sheets

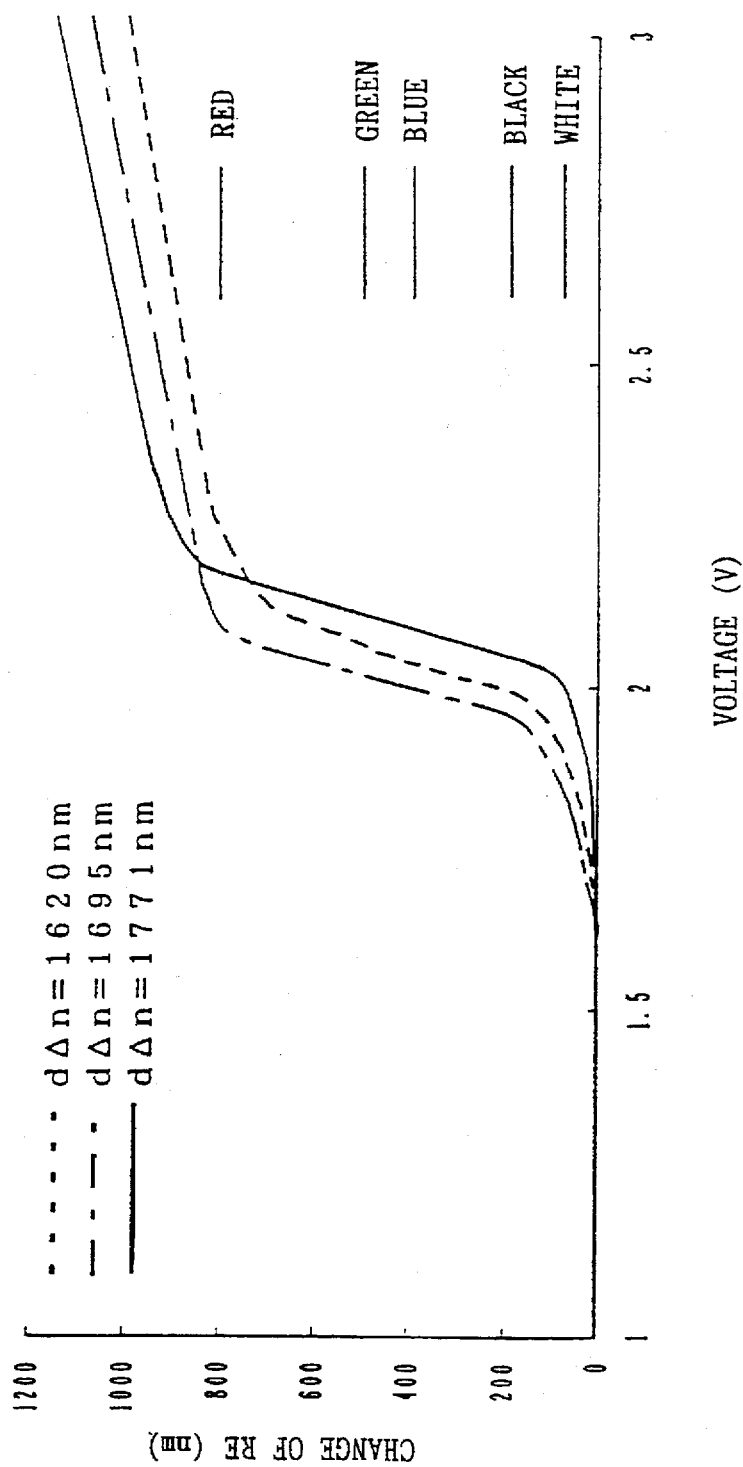

ORIENTATION DIRECTION
OF LIQUID CRYSTAL MOLECULES

POLARIZER

PHASE DIFFERENCE PLATE

ORIENTATION DIRECTION
OF LIQUID CRYSTAL MOLECULES

POLARIZER

PHASE DIFFERENCE PLATE

ORIENTATION DIRECTION
OF LIQUID CRYSTAL MOLECULES

POLARIZER

PHASE DIFFERENCE PLATE

ORIENTATION DIRECTION
OF LIQUID CRYSTAL MOLECULES

POLARIZER

PHASE DIFFERENCE PLATE

ORIENTATION DIRECTION
OF LIQUID CRYSTAL MOLECULES

POLARIZER

PHASE DIFFERENCE PLATE

ORIENTATION DIRECTION
OF LIQUID CRYSTAL MOLECULES

POLARIZER

PHASE DIFFERENCE PLATE

ORIENTATION DIRECTION
OF LIQUID CRYSTAL MOLECULES

POLARIZER

PHASE DIFFERENCE PLATE

ORIENTATION DIRECTION
OF LIQUID CRYSTAL MOLECULES

POLARIZER

PHASE DIFFERENCE PLATE

5,737,046

BIREFRINGENCE CONTROL TYPE LIQUID CRYSTAL DISPLAY DEVICE

BACKGROUND OF THE INVENTION

1. Field of the Invention

The present invention relates to a super-twisted nematic type (STN type) color liquid crystal display device for displaying images or characters by making use of a birefringent effect, and more particularly to a birefringence control type liquid crystal display device capable of providing a monochromatic display and a color display wish a high saturation of one color or more including red.

2. Description of the Related Art

As a prior art, an example of a liquid crystal display device used in portable type information appliances is described below.

Hitherto, in the display of portable type information appliances, a reflection type monochromatic liquid crystal display device has been used in consideration of portability. Recently, it has been attempted to develop a multi-color liquid crystal display device capable of providing a color display comprising a plurality of colors for the improvement of visual recognition. In particular, in the case of the liquid crystal display device used in portable type information appliance, in addition to a monochromatic display of high contrast, there is a growing demand for a color display including red in consideration of visual recognition.

As means for the color display, it is general to employ a color filter. This method is intended to realize a multi-color display by forming red, green and blue color filters corresponding to each pixel on one of a pair of transparent substrates for sandwiching the liquid crystal, and coloring the light passing through the pixels by the color filters.

As a method of providing the color display without using the color filters, a birefringence control type liquid crystal display device has been known. This birefringence control type liquid crystal display device is intended to realize a multi-color display by making use of the birefringent effect, that is, the product $d\Delta n$ of a refractive index anisotropy $\Delta n$ of liquid crystal molecules and a cell gap d of a liquid crystal cell (hereinafter referred to as $d\Delta n$ of the liquid crystal cell) varies depending on a voltage applied to a liquid crystal layer, and an intensity of colors such as red, green, and blue which pass through the liquid crystal layer varies depending on this change.

An art of the birefringence control type liquid crystal display device is disclosed, for example, in Japanese Unexamined Patent Publication JP-A 2-118516 (1990), Japanese Unexamined Patent Publlication JP-A-6 175125 (1994), and Japanese Unexamined Patent Publication JP-A-7 54 57 (1995) or the like.

JP-A 2-118516 (1990) discloses an art of realizing a color display by defining the $d\Delta n$ of a liquid crystal cell above 1100 nm and providing with means capable of selecting three values or more as a voltage to be applied to the liquid crystal cell out of three or more values. As disclosed in the same publication, two liquid crystal cells are provided between a pair of polarizers, a driving circuit is connected to each liquid crystal cell (a liquid crystal cell for driving and a liquid crystal cell for optical compensation) so that a color display simultaneously containing a white display and a black display is made possible.

JP-A 6-175125 (1994) discloses a birefringence control type liquid crystal display device wherein a phase difference plate is disposed between a pair of polarizers located outside of a liquid crystal cell. The same publication discloses that a coloration effect by the birefringence in the liquid crystal cell with a multiple tones is emphasized by the birefringent effect of the phase difference plate and the color characteristics of red, green and blue the $d\Delta n$ of the liquid crystal cell is improved by setting the $d\Delta n$ of the liquid crystal cell to a range of 1000 nm to 2000 nm to enhance the color characteristic, and further by setting the product $d_R\Delta n_R$ of a refractive index anisotropy $\Delta n_R$ and a thickness $d_R$ of this phase difference plate (hereinafter referred to as $d_R\Delta n_R$ of the phase difference plate) in a Formula of ($d\Delta n$ of liquid crystal cell)×r×(1/N), where N is the number of pieces of the phase difference plates, and setting a coefficient r in this case to 0.70 to 0.95. The same publication discloses that a white display can be realized by setting the $d\Delta n$ of the liquid crystal cell to a range of 1500 nm to 2000 nm, and the display color can be varied in different tones by setting the $d\Delta n$ of the liquid crystal cell to 1400 nm or 1600 nm.

JP-A 7-5457 (1995) discloses a birefringence control type liquid crystal display device wherein a twisted phase difference plate is disposed between a pair of polarizers located outside of a liquid crystal cell. The same publication discloses that a non-colored white display as well as a color display can be obtained because the liquid crystal cell functions as means of discoloring the color display when the liquid crystal molecule of the liquid crystal cell is set in an initial orientation state by setting the value of $d_R\Delta n_R$ of the twisted phase difference plate to a value approximately equal to a value of the $d\Delta n$ of the liquid crystal cell and the twist angle of the phase difference axis to be approximately equal to the twist angle of liquid crystal molecule, setting and the twist direction of the slow axis of the twisted phase difference plate to be reverse to the twist direction of the liquid crystal molecule of the liquid crystal cell, and setting the transmission axes (absorption axes) of the pair of polarizers to be approximately parallel to each other. The same publication also discloses a clear and bright colored light can be obtained by setting to a range of 45±5 degrees a deviation angle formed by the transmission axis (absorption axis) of the polarizer at the incident side or at the surface side and a direction located at the light incident side, the direction being selected out of the direction off the slow axis at the incident side of the twisted phase plate and the liquid crystal molecule orientation direction at the incident side of the liquid crystal cell.

However, the liquid crystal display device using the color filter has a problem in that a reflection type has a dark display while a light transmission type needs a backlight when the display is applied in portable type information appliances with the result that the weight, the thickness and the power consumption increases because the color filter is expensive and the light usage efficiency is low.

Besides, the birefringence control type liquid crystal display device has the following problems.

First, in the birefringence control type liquid crystal display device disclosed in JP-A 2-118516 (1990), no optical compensation is performed because no phase difference plate is provided, and no color display including a monochromatic display can not be provided. If the liquid crystal cell for driving and liquid crystal cell for optical compensation are used, a color display including monochromatic display is possible, but two liquid crystal cells must be used, and the drive device must be connected to both liquid crystal cells, and hence the power consumption is increased aside from thickness and weight, and it is not suited for a portable use.

Furthermore, in the birefringence control type liquid crystal display device disclosed in JP-A 6-175125 (1994), red, green and blue color display of an excellent color characteristic is realized by using the phase difference plate, but white and black could not be displayed simultaneously in addition to the color display.

Furthermore, in the birefringence control type liquid crystal display device disclosed in Japanese Unexamined Patent JP-A 7-5457 (1995), a bright color display having a high light transmissivity is realized by using the twisted phase difference plate, and a white display in addition to a color display including red, green, blue and the like by allowing the liquid crystal cell to function as means of discoloring the color display when the liquid crystal molecule of the liquid crystal cell is in an initial orientation state, but white and black could not be displayed simultaneously in addition to the color display.

Moreover, in JP-A 2-118516 (1990), a plurality of values in a range of 1300 to 1600 nm are given as the d fin of the liquid crystal cells disclosed in the embodiments of these three publications. A value of $d\Delta n=1400$ nm is given in JP-A 6-175125 (1994), and $d\Delta n=848$ nm is given in JP-A 7-5457 (1995). However, when the $d\Delta n$ of the liquid crystal cell is less than 1700 nm, as shown in FIG. 4, a difference between an effective voltage necessary at the time of a red display at the highest driving voltage and an effective voltage necessary at the time of a white display at the lowest driving voltage becomes large so that the liquid crystal display cannot be driven at a high duty thereby making it impossible to cope with a trend of a high definition and a wide display.

SUMMARY OF THE INVENTION

The invention is made to solve these problems, and it is hence an object thereof to provide a birefringence control type liquid crystal display device capable of providing a color display including red in addition to a monochromatic display in order to further enhance visual recognition.

The present invention provides a birefringence control type liquid crystal display device comprising:
- a liquid crystal cell having an STN type liquid crystal sandwiched by two substrates;
- a pair of polarizers disposed so as to sandwich the liquid crystal cell; and
- a phase difference plate disposed between the pair of polarizers;
- wherein the phase difference plate is made of a high polymer film, and the product $d\Delta n$ of a refractive index anisotropy $\Delta n$ of the STN type liquid crystal and a cell gap d of the liquid crystal cell is in a range of 1700 nm to 1950 nm.

The invention is characterized in that the phase difference plate is made of a uniaxially drawn film, and a difference $(d\Delta n-d_R\Delta n_R)$ between the product $d\Delta n$ of the refractive index anisotropy $\Delta n$ of the STN type liquid crystal and a cell gap d of the liquid crystal cell, and the product $d_R\Delta n_R$ of a refractive index anisotropy $\Delta n_R$ of the uniaxially drawn film and a thickness $d_R$ of the uniaxially drawn film is in a range of 750 nm to 850 nm.

The invention is further characterized in that
- the STN type liquid crystal is disposed between the two substrates so that a twist angle of liquid crystal molecules of 230° to 260° is provided,
- the pair of polarizers sandwiching the liquid crystal cell is disposed so that the absorption axes thereof cross each other at an angle of 50° to 70°, and that the absorption axis of each polarizer and the orientation direction of the liquid crystal molecules adjacent to each of the polarizer cross each other at an angle of 30° to 50°, and
- the phase difference plate made of the uniaxially drawn film disposed between the pair of polarizers is disposed so that the slow axis of the phase difference plate cross the orientation direction of the liquid crystal molecules adjacent to the phase difference plate at an angle of 80° to 100°.

The invention is still further characterized in that the phase difference plate is made of a uniaxially drawn film, and the difference $(d\Delta n-d_R\Delta n_R)$ between the product $d\Delta n$ of the refractive index anisotropy $\Delta n$ of the STN type liquid crystal and the cell gap d of the liquid crystal cell, and the product $d_R\Delta n_R$ of a refractive index anisotropy $\Delta n_R$ of the uniaxially drawn film and a thickness $d_R$ of the uniaxially drawn film is in a range of $-100$ nm to 100 nm.

The invention is still further characterized in that
- the STN type liquid crystal is disposed between the two substrates so that a twist angle of liquid crystal molecules of 230° to 260° is provided,
- the pair of polarizers sandwiching the liquid crystal cell is disposed so that the absorption axes thereof cross each other at an angle of 10° to 30°, and that the absorption axis of each polarizer and the orientation direction of the liquid crystal molecules adjacent to each polarizer cross each other at an angle of 30° to 50°, and
- the phase difference plate made of the uniaxially drawn film disposed between the pair of polarizers is disposed so that the slow axis of the phase difference plate cross the orientation direction of the liquid crystal molecules adjacent to the phase difference plate at an angle of 80° to 100°.

The invention is still further characterized in that the phase difference plate is a twisted phase difference plate, and the difference $(d\Delta n-d_R\Delta n_R)$ between the product $d\Delta n$ of the refractive index anisotropy $\Delta n$ of the STN type liquid crystal and the cell gap d of the liquid crystal cell, and the product $d_R\Delta n_R$ of a refractive index anisotropy $\Delta n_R$ and a thickness $d_R$ of the twisted phase difference plate is in a range of $-150$ nm to 150 nm.

The invention is still further characterized in that
- the STN type liquid crystal is disposed between the two substrates so that a twist angle of liquid crystal molecules of 230° to 260° is provided,
- the pair of polarizers sandwiching the liquid crystal cell is disposed so that the absorption axes thereof cross each other at an angle of 5° to 35°, and that the absorption axis of each polarizer and the orientation direction of the liquid crystal molecules adjacent to each polarizer cross each other at an angle of 10° to 50°, and
- the twisted phase difference plate disposed between the pair of polarizers is disposed so that the twist angle of the slow axis of the phase difference plate is larger than the twist angle of the liquid crystal molecules by 1° to 50°, preferably 10° to 40°, that the twist direction of the slow axis is reverse to the twist direction of the liquid crystal molecules, and that the slow axis of the liquid crystal cell side of the phase difference plate crosses the orientation direction of the liquid crystal molecules adjacent to the phase difference plate at an angle of 80° to 100°.

Hereinafter, the operation of these constitutions are described.

According to the invention, a color change due to a variation in a birefringent index at the time of voltage application is increased by setting $d\Delta n$ of liquid crystal cell to 1700 nm or more, and a multi-color display including a monochromatic display can be realized. At the same time, a difference between an effective voltage necessary for a red color display at the highest driving voltage and an effective voltage for a white color display at the lowest driving voltage can be decreased, and the liquid crystal display device of the invention can be driven at a high duty.

On the other hand, the cell gap d for determining the value of $d\Delta n$ of the liquid crystal cell should be made as small as possible in consideration of the contrast, the response speed, or the orientation margin expressed by $d/p$. Preferably, the cell gap d is set to 7.5 µm or less, As for $\Delta n$ for determining the value of $d\Delta n$, when the liquid crystal having $\Delta n$ of 0.26 or more is used, a favorable characteristics may not be obtained as for the contrast, the response speed or the orientation margin, and when the composition of the liquid crystal is adjusted for such purpose, a mass production is difficult, which will lead to an increase in the cost. Hence, $\Delta n$ is preferably set to 0.26 or less. Therefore, the $d\Delta n$ of the liquid crystal cell is preferably set to 1950 nm or less.

According to the invention, when a uniaxially drawn film is used as the phase difference plate, a non-colored white display can be realized because the birefringent effects of the liquid crystal cell and the phase difference plate act to cancel each other by setting the difference ($d\Delta n - d_R \Delta n_R$) between $d\Delta n$ of the liquid crystal cell and $d_R \Delta n_R$ of the phase difference plate to a range of 750 nm to 850 nm or -100 nm to 100 nm.

Furthermore, according to the present invention, when the difference ($d\Delta n - d_R \Delta n_R$) between $d\Delta n$ of the liquid crystal cell and $d_R \Delta n_R$ of the phase difference plate is set to 750 nm to 850 nm, the brightness of the color characteristic such as the brightness of the display color, saturation or the like can be enhanced, the non-colored black display can be realized and a white and black contrast can be enhanced by disposing the liquid crystal cell and the pair of polarizers so that the twist angle of STN liquid crystal molecules contained in the liquid crystal cell is set to 230° to 260°, the absorption axes of the pair of polarizers sandwiching the liquid crystal cell cross each other at an angle of 50° to 70°, and the absorption axes of the polarizers and the orientation direction of liquid crystal molecules adjacent to the polarizers cross each other at an angle of 30° to 50°, and at the same time by disposing the phase difference plate between the pair of polarizers so that the slow axis of the phase difference plate made of uniaxially drawn film crosses the orientation direction of the liquid crystal molecules adjacent to the phase difference plate at an angle of 80° to 100°.

Furthermore, according to the invention, when the difference ($d\Delta n - d_R \Delta n_R$) between $d\Delta n$ of the liquid crystal cell and $d_R \Delta n_R$ of the phase difference plate is set to a range of -100 nm to 100 nm, the color characteristics such as the rightness of the display color, saturation or the like can be enhanced, a non-colored black display can be realized, and a white and black display can be enhanced by disposing the liquid crystal cell and the pair off polarizers so that the twist angle of STN liquid crystal molecules contained in the liquid crystal cell is set to 230° to 260°, the absorption axes of the pair of polarizers sandwiching the liquid crystal cell cross each other at an angle of 10° to 30°, each of the absorption axes of the polarizers and the orientation direction of liquid crystal molecules adjacent to the polarizer cross at an angle of 30° to 50°, and at the same time disposing the phase difference plate between the pair of polarizers so that the slow axis off the phase difference plate made of uniaxially drawn film crosses the orientation direction of the liquid crystal molecules adjacent to the phase difference plate at an angle of 80° to 100°.

Furthermore, according to the invention, when a twisted phase difference plate is used as the phase difference plate, a non-colored white display can be realized because the birefringent effects of liquid crystal cell and the phase difference plate act to cancel each other by setting the difference ($d\Delta n - d_R \Delta n_R$) between $d\Delta n$ of the liquid crystal cell and $d_R \Delta n_R$ of the phase difference plate to a range of -150 nm to 150 nm.

Furthermore, according to the invention, the color characteristics such as the brightness of the display color, saturation or the like can be enhanced, a non-colored black display can be realized and a white and black contrast can be improved by the liquid crystal cell and the pair of polarizers so that the twist angle of STN liquid crystal molecules contained in the liquid crystal cell is set to 230° to 260°, the absorption axes of the pair of polarizers sandwiching the liquid crystal cell cross each other at an angle of 5° to 35°, the absorption axis of each of polarizers and the orientation direction of liquid crystal molecules adjacent to the polarizer cross at an angle of 10° to 50°, and at the same time disposing the twisted phase difference plate between the pair of polarizers so that and the slow axis of the twisted phase difference plate crosses the orientation direction of the liquid crystal molecules adjacent to the twisted phase difference plate at an angle of 80° to 100°.

As described above, in the birefringence control type liquid crystal display device of the invention, a monochromatic display as well as a multi-color display including a red display can be realized because a color change resulting from a change in the birefringent index of liquid crystal molecules at the time of the voltage application is enlarged by setting $d\Delta n$ of liquid crystal cell to a range of 1700 nm to 1950 nm. At the same time, the difference between the effective voltage necessary for the red color display at the highest driving voltage and the effective voltage for white color display at the lowest driving voltage can be decreased, and driving at high duty can be realized.

Therefore, according to the invention, when the liquid crystal display device of the invention is applied in a portable information appliance, there is provided an advantage such that a bright multi-color display is obtained which includes red because no color filter is used therein. Besides, the liquid crystal display device can be driven at a high duty. hence it is suited to a high definition and wide display.

According to the invention, when a uniaxially drawn film is used as the phase difference plate, a non-colored white display can be realized because the birefringent effects of liquid crystal cell and phase difference plate act to cancel each other by setting the difference ($d\Delta n - d_R \Delta n_R$) between $d\Delta n$ of the liquid crystal cell and $d_R \Delta n_R$ of the phase difference plate to a range of 750 nm to 850 nm or -100 nm to 100 nm.

Moreover, according to the invention, when the difference ($d\Delta n - d_R \Delta n_R$) between $d\Delta n$ of the liquid crystal cell and $d_R \Delta n_R$ of the phase difference plate is set to 750 nm to 850 nm, a non-colored black can be realized and a white and black display can be realized by disposing the liquid crystal cell and the pair of polarizers so that the twist angle of STN liquid crystal molecules contained in the liquid crystal cell is set to 230° to 260°, the absorption axes of the pair of polarizers sandwiching the liquid crystal cell cross each other at an angle of 50° to 70°, and the absorption axis of each polarizer and the orientation direction of liquid crystal molecules adjacent to the polarizer cross at an angle of 30° to 50°, and at the same time by disposing the phase difference plate made of uniaxially drawn film between the pair of polarizers so that the slow axis of the phase difference plate crosses the orientation direction of the liquid crystal molecules adjacent to the phase difference plate at an angle of 80° to 100°, with the result that a non-colored black display can be realized, and a black and white contrast can be enhanced. In addition, the brightness of the display color, and color characteristics such as saturation can be enhanced.

Furthermore, according to the invention, when the difference ($d\Delta n - d_R \Delta n_R$) between $d\Delta n$ of the liquid crystal cell and $d_R \Delta n_R$ of the phase difference plate is set to a range of $-100$ nm to 100 nm, a non-colored black display can be realized, a white and black contrast can be enhanced and color characteristics such as the brightness of the display color and saturation can be also enhanced by disposing the liquid crystal cell and the pair of polarizers so that the twist angle of STN liquid crystal molecules contained in the liquid crystal cell is set to 230° to 260°, the absorption axes of the pair of polarizers sandwiching the liquid crystal cell cross each other at an angle of 10° to 30°, and the absorption axis of each of the polarizers and the orientation direction of liquid crystal molecules adjacent to the polarizer cross at an angle of 30° to 50°, and at the same time by disposing the phase difference plate made of uniaxially drawn film between the pair of polarizers so that the slow axis of the phase difference plate made of uniaxially drawn film crosses the orientation direction of the liquid crystal molecules adjacent to the phase difference plate at an angle of 80° to 100°.

On the other hand, according to the invention, when a twisted phase difference plate is used as the phase difference plate, a non-colored white display can be realized because the birefringent effects of the liquid crystal cell and phase difference plate act to cancel each other by setting the difference ($d\Delta n - d_R \Delta n_R$) between $d\Delta n$ of the liquid crystal cell and $d_R \Delta n_R$ of the phase difference plate to $-150$ nm to 150 nm.

Furthermore, according to the invention, a non-colored black display can be realized, a white and black contrast can be realized and the color characteristics such as the brightness of the color, saturation or the like can be enhanced by setting the twist angle of STN liquid crystal molecules contained in the liquid crystal cell at 230° to 260°, and disposing the liquid crystal cell and the pair of polarizers sandwiching the liquid crystal cell so that the absorption axes of the pair of polarizers sandwiching the liquid crystal cell cross each other at an angle of 5° to 35°, and that the absorption axis of each polarizer and the orientation direction of liquid crystal molecules adjacent to the polarizer cross at an angle of 10° to 50°, and at the same time by disposing the phase difference plate disposed between the pair of polarizers so that the slow axis on the liquid crystal side of the phase difference plate crosses the orientation direction of the liquid crystal molecules adjacent to the phase difference plate at an angle of 80° to 100°.

BRIEF DESCRIPTION OF THE DRAWINGS

Other and further objects, features, and advantages of the invention will be more explicit from the following detailed description taken with reference to the drawings wherein:

FIG. 4 is a graph showing changes in Re of liquid crystal layer in terms of a voltage applied to a liquid crystal cell, in every $d\Delta n$ of the liquid crystal;

DETAILED DESCRIPTION OF THE PREFERRED EMBODIMENTS

Figure 1:
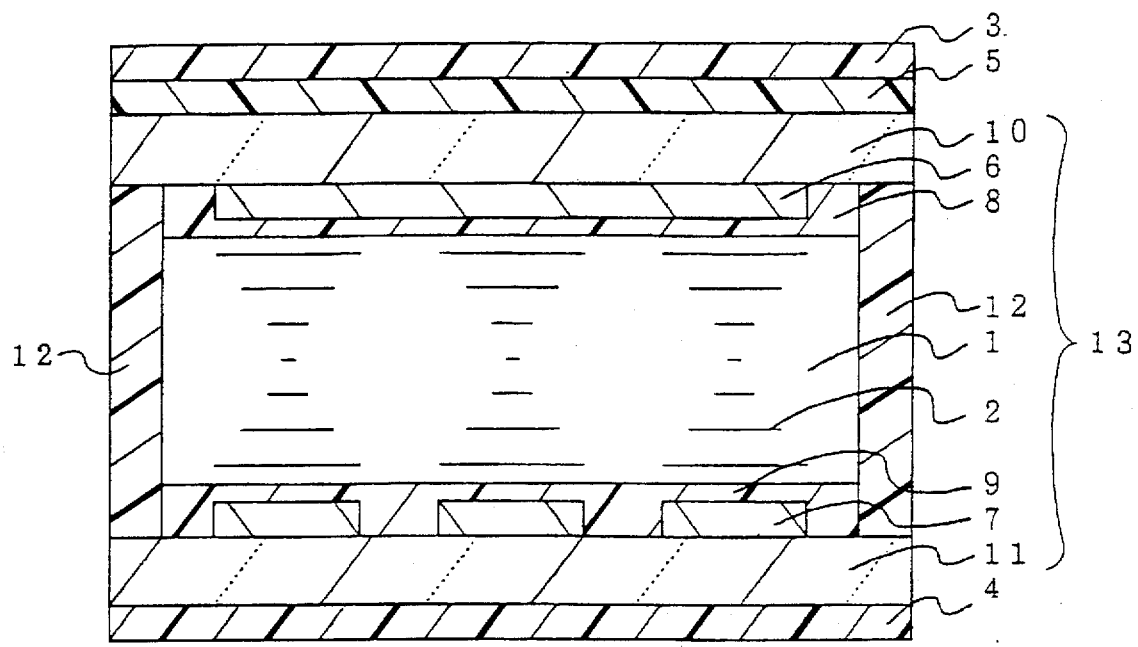
FIG. 1 is a sectional view showing a liquid crystal panel 21 of a liquid crystal display device according to an embodiment of the invention.

Now referring to the drawings, preferred embodiments of the invention are described below.

(First Embodiment)

FIG. 1 is a sectional view of a liquid crystal panel 21 of a birefringence control type liquid crystal display device of a first embodiment of the invention. This liquid crystal panel 21 is constituted by disposing an upper polarizer 3 and a lower polarizer 4 on both sides of a liquid crystal cell 13 having a liquid crystal 1 sealed between a pair of transparent substrates 10 and 11 laminated to each other via a seal 12, and disposing a phase difference plate 5 between the liquid crystal cell 13 and upper polarizer 3. On one side surface of each of the pair of transparent substrates 10, 11, stripe-like transparent electrodes 6 and 7, and orientation films 8 and 9 are formed in such a manner that the orientation films 8 and 9 cover the transparent electrodes 6 and 7. The substrates 10 and 11 are laminated together so that the stripe transparent electrodes 6, 7 cross each other at right angle and face each other. Incidentally, a plurality of phase difference plates 5 may be also formed. In such a case, the $d_R \Delta n_R$ of the phase difference plate refers to the sum of $d_R \Delta n_R$ of all phase difference plates.

The liquid crystal panel 21 is of STN type. That is, the liquid crystal molecules 2 contained in the liquid crystal cell 13 are oriented so as to be twisted by 240 degrees between the pair of transparent substrates 10 and 11.

In this embodiment, the liquid crystal molecules 2 contain 65% tolan type derivative, and the refractive index anisotropy $\Delta n$ of the liquid crystal is 0.24. The thickness d of the cell is 7.5 μm. Hence, $d\Delta n$ of the liquid crystal cell is 1800 nm.

Furthermore, in this embodiment, the upper polarizer 3 is a polarizer EG1225DU manufactured by Nitto Denko Co. Ltd., and the lower polarizer 4 is a polarizer F3205G manufactured by Nitto Denko Co. Ltd. which is a reflector integrated type polarizer. The phase difference plate 5 is of a polycarbonate material manufactured by Nitto Denko Co., Ltd. which is a uniaxially drawn film. The product $d_R \Delta n_R$ of the refractive index anisotropy $\Delta n_R$ and the thickness $d_R$ of the phase difference plate 5 in this embodiment is 1000 nm.

Figure 5A:
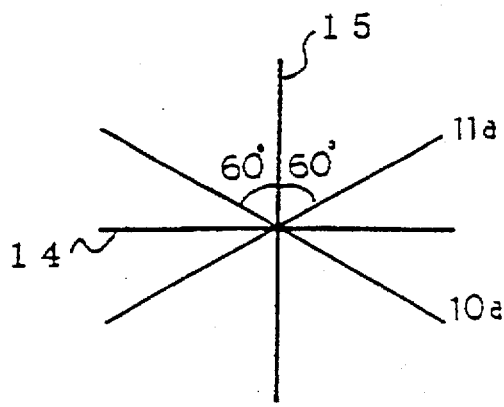
FIGS. 5A to 5C are diagrams showing liquid crystal molecule orientation directions of a liquid crystal cell, absorption axes of a pair of polarizers, and a slow axis of a phase difference plate in a first embodiment.
Figure 5B:
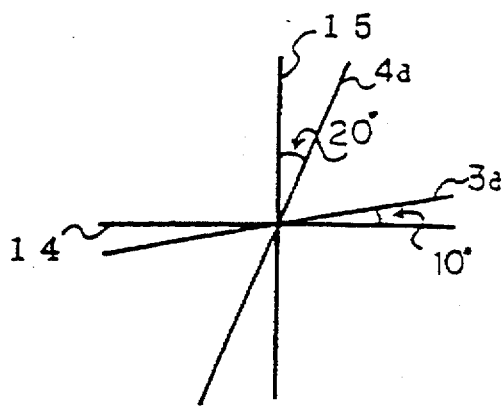
Figure 5C:
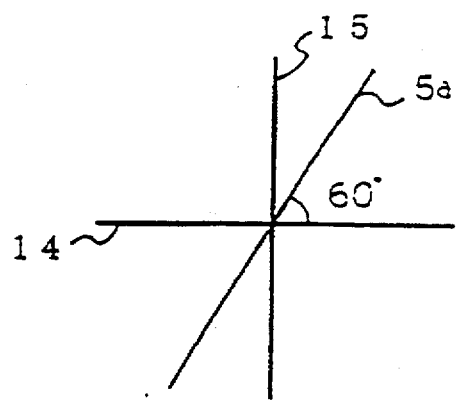

FIGS. 5A to 5C are plan views showing a configuration of orientation directions of the liquid crystal molecules 2, absorption axes of polarizers 3 and 4, and ta slow axis of the phase difference plate 5 in the liquid crystal display device of the embodiment, as seen from the observer, that is, from the upper side in FIG. 1, wherein reference numeral 10a denotes the orientation direction of the liquid crystal molecules 2 on the side of the transparent substrate 10 and 11a denotes the orientation direction of liquid crystal molecules 2 on the side of the transparent substrate 11, reference numeral 3a denotes the absorption axis of the upper polarizer 3, reference numeral 4a denotes the absorption axis of the lower polarizer 4, and 5a denotes the slow axis of the phase difference plate 5. Reference numerals 14 and 15 denote reference orthogonal axes.

As can be seen from these diagrams, in this embodiment, the crossing angle of the slow axis 5a of the phase difference plate 5, and the orientation direction 10a of the liquid crystal molecules 2 on the side adjacent thereto is set to 90°. The crossing angle of the absorption axis 3a of the upper polarizer 3 and the absorption axis 4a of the lower polarizer 4 is set to 60°. Furthermore, the crossing angle of the absorption axis 3a of the upper polarizer 3 and the orientation direction 10a of the liquid crystal molecules 2 on the side adjacent thereto, and the crossing angle of the absorption axis 4a of the lower polarizer 4 and the orientation direction 11a of the liquid crystal molecules 2 on the side adjacent thereto are both set to 40°.

Figure 6:
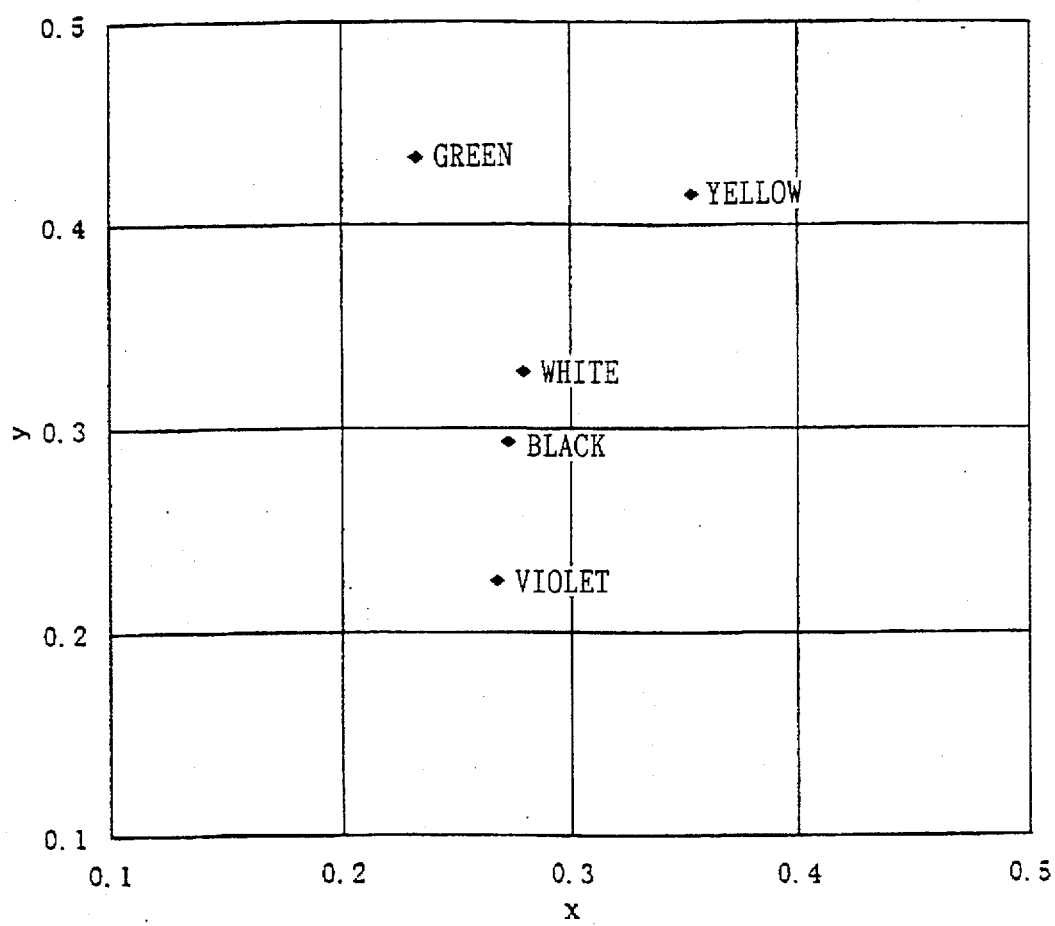
FIG. 6 is a CIE chromaticity diagram in the first embodiment.

When the liquid crystal display device having such liquid crystal panel 21 was driven by voltage at (1/160) duty and (1/13) bias, and gradation voltages were applied, the orientation of the liquid crystal molecules 2 was changed depending on the applied gradation voltages, and along with this change, as shown in the CIE chromaticity diagram in FIG. 6, colors changed as green, violet, yellow, white and black, and a color display was realized in addition to black and white colors. Besides, the orientation direction of liquid crystal molecules, the slow axis of the phase difference plate, and the absorption axes of the polarizers were optimized, and hence the characteristics of display colors were improved. At the same time, the black and white contrast was enhanced, and a sharp display was realized.

The twist angle of liquid crystal molecules is set to 240° in this embodiment, the twist angle is preferred to be selected in a range of 230° to 260°. When the twist angle is 230° or less, a change in $d\Delta n$ in a period between the time of application of the voltage and the time of no application of the voltage is small. When the twist angle is 260° or more, the orientation margin of liquid crystal molecules will be narrowed and such tendency is not preferable.

Besides, although $d\Delta n$ of the liquid crystal cell is set to 1800 nm, this $d\Delta n$ is preferred to be selected in a range of 1700 nm to 1950 nm.

Furthermore, although $d\Delta n - d_R \Delta n_R$ is 800 nm at $d_R \Delta n_R$ of 1000 nm, this $d\Delta n - d_R \Delta n_R$ is preferred to be selected in a range of 750 nm to 850 nm.

The crossing angle of the absorption axes 3a and 4a of the polarizers 3 and 4 is 60°, and this crossing angle is preferred to be selected in a range of 50° to 70°.

Furthermore although the crossing angle of the absorption axis 3a of the upper polarizer 3 and the orientation direction 10a of the liquid crystal molecules 2 adjacent thereto, and the crossing angle of the absorption axis 4a of the lower polarizer 4 and the orientation direction 11a of the liquid crystal molecules 2 adjacent thereto are both set to 40°, and this crossing angle is preferred to be selected in a range of 30° to 50°.

Furthermore, although the crossing angle of the slow axis 5a of the phase difference plate 5 and the orientation direction 10a of the liquid crystal molecules 2 adjacent thereto is set to 90°, preferably this crossing angle is selected in a range of 80° to 100°.

In other words, each crossing angle is selected in a range of ±10° with respect to the most appropriate angle. When the crossing angle deviates from such range, the contrast of the display will be deteriorated. Furthermore, in systems in which the display is colored on the basis of white, the display background is colored so that it becomes difficult to display white color.

(Second Embodiment)

The constitution of the liquid crystal panel of the birefringence control type liquid crystal display device according to a second embodiment is almost the same as the counterpart of the liquid crystal panel according to the first embodiment, except that setting of $d\Delta n$ of the liquid crystal cell 13, $d_R \Delta n_R$ of the phase difference plate 5, an orientation direction of liquid crystal molecules 2, slow axis of the phase difference plate 5, and absorption axes of the upper and lower polarizers 3 and 4 are set in a different manner from the counterpart of the first embodiment.

In this embodiment, the liquid crystal molecules 2 contain tolan derivative by 60%, and the refractive index anisotropy $\Delta n$ of the liquid crystal is set to 0.23. Furthermore, the thickness of the cell is 7.5 μm. Hence, $d\Delta n$ of liquid crystal cell is 1725 nm. The phase different plate 5 is made of a material whose $d_R \Delta n_R$ is 1700 nm.

Figure 7A:
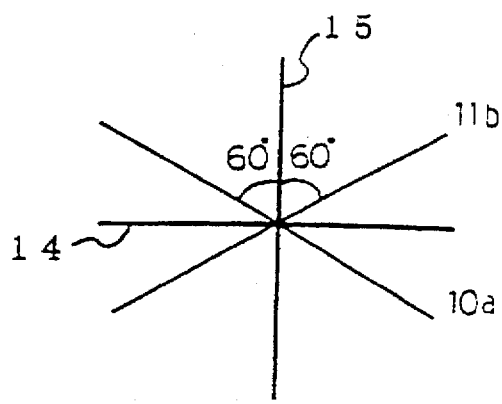
FIGS. 7A to 7C are diagrams showing liquid crystal molecules orientation directions of a liquid crystal cell, absorption axes of a pair of polarizers, and a slow axis of a phase difference plate in a second embodiment.
Figure 7B:
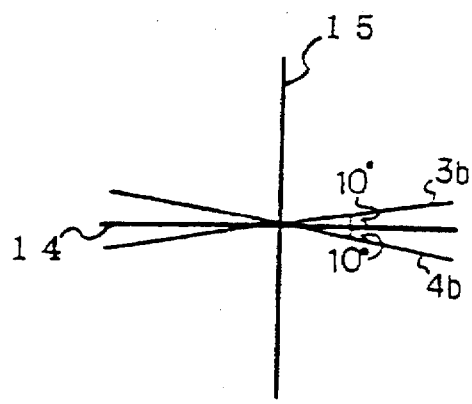
Figure 7C:
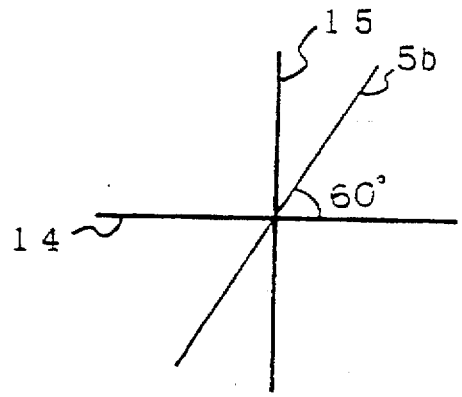

FIGS. 7A to 7C are plan views showing a configuration of orientation directions of the liquid crystal molecules 2, absorption axes of the polarizers 3 and 4, and a slow axis of the phase difference plate 5 of the liquid crystal display device of the embodiment, as seen from the observer, that is, from the upper side in FIG. 1, wherein reference numeral 10b denotes the orientation direction of the liquid crystal molecules 2 on the side of the transparent substrate 10, reference numeral 11b denotes the orientation direction of liquid crystal molecules 2 on the side of the transparent substrate 11, reference numeral 3b denotes the absorption axis of the upper polarizer 3, reference numeral 4b denotes the absorption axis of the lower polarizer 4, and reference numeral 5b denotes the slow axis of the phase difference plate 5. Reference numerals 14 and 15 denotes reference orthogonal axes.

As can be seen from these diagrams, in this embodiment, the crossing angle of the slow axis 5b of the phase difference plate 5, and the orientation direction 10b of the liquid crystal molecules 2 on the side adjacent thereto is 90°. The crossing angle of the absorption axis 3b of the upper polarizer 3 and the absorption axis 4b of the lower polarizer 4 is 20°. Furthermore, the crossing angle of the absorption axis 3b of the upper polarizer 3 and the orientation direction 10b of the liquid crystal molecules 2 of the side adjacent thereto, and the crossing angle of the absorption axis 4b of the lower polarizer 4 and the orientation direction 10b of the liquid crystal molecules 2 of the side adjacent thereto are both 40°.

Figure 8:
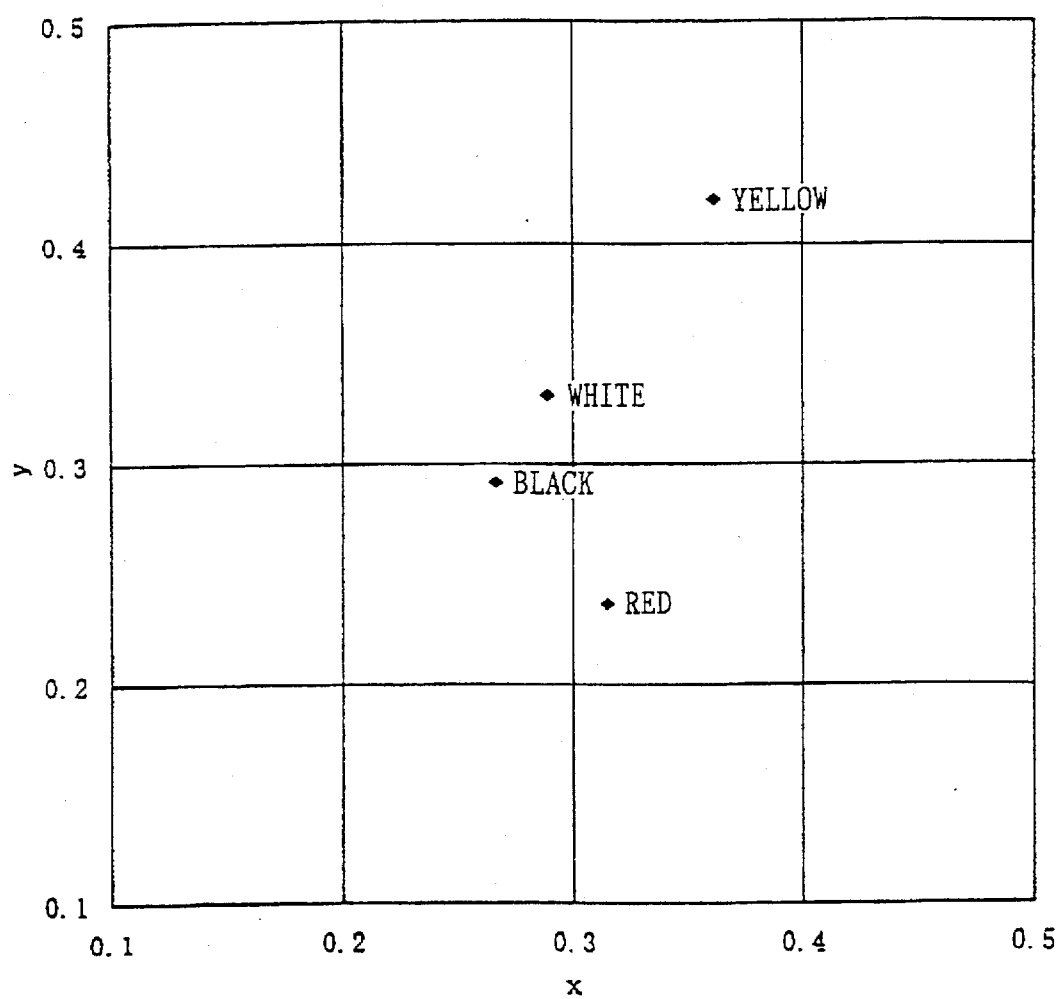
FIG. 8 is a CIE chromaticity diagram in the second embodiment.

When the liquid crystal display device having such liquid crystal panel was driven by voltage at (1/120) duty and (1/13) bias, and gradation voltages were applied, the orientation of the liquid crystal molecules 2 changed depending on the applied gradation voltages, and along with this change, as shown in the CIE chromaticity diagram in FIG. 8, colors changed as white, black, yellow, and red, and a color display was enabled in addition to black and white colors. Besides, the orientation direction of the liquid crystal molecules, the slow axis of the phase difference plate, and the absorption axes of the polarizers were optimized, and hence the characteristics of display colors were improved. At the same time, the black and white contrast was enhanced, and a sharp display was realized.

Incidentally, in the embodiment, although dΔn is set to 1725 nm, and $d_R\Delta n_R$ is set to 1700 nm so that dΔn–$d_R\Delta n_R$ is set to 25 nm, this dΔn–$d_R\Delta n$ is preferred to be selected in a range of –100 nm to 100 nm. The dΔn–$d_R\Delta n$ is a value needed when either white or black is lit. At the time of the voltage application, white and black is displayed in a range of 0 through 200 nm.

Although the crossing angle of the absorption axes 8b and 4b of the polarizers 3 and 4 is set to 20°, and this crossing angle is preferred to be selected in a range of 10° to 30°.

The other conditions are preferred to be selected in a range as specified in the first embodiment.

(Third Embodiment)

The constitution of the liquid crystal panel of the birefringence control type liquid crystal display device according to a third embodiment is approximately the same as the constitution of the first embodiment, except that dΔn of the liquid crystal cell 13 and $d_R\Delta n_R$ of the phase difference plate 5 are different from those of the first embodiment.

In this embodiment, the liquid crystal molecules 2 contain tolan derivative by 70%, and the refractive index anisotropy Δn of the liquid crystal is set to 0.255. The cell thickness is set to 7.5 μm. Hence, dΔn of the liquid crystal cell is set to 1913 nm. The phase different plate 5 is made of a material whose $d_R\Delta n_R$ is set to 1110 nm. Therefore, dΔn–$d_R\Delta n_R$ is 803 nm.

The orientation direction of the liquid crystal molecules, the slow axis of the phase difference plate, and the absorption axes of the upper and lower polarizers are set in the same manner as in the first embodiment.

When such liquid crystal display device was driven by voltage at (1/120) duty and (1/13) bias, and to apply a gradation voltage, the orientation of the liquid crystal molecules 2 was changed depending on the applied gradation voltages, and along with this change, colors changed as white, black, yellow, and red, and a color display was realized in addition to black and white colors. Besides, the orientation direction of the liquid crystal molecules, the slow axis of the phase difference plate, and the absorption axes of the polarizers were optimized, and hence the characteristics of display colors were improved. At the same time, the black and white contrast was enhanced, and a clear and vivid display was realized.

In the first to third embodiments, uniaxially drawn films were used as the high polymer films for the phase difference plate 5, and in the subsequent embodiments, twisted phase difference plates are used as the high polymer films for the phase difference plate 5.

(Fourth Embodiment)

The constitution of the liquid crystal panel of the birefringence control type liquid crystal display device according to a Fourth embodiment is similar to the counterpart of the liquid crystal display device shown in FIG. 1, except that the liquid crystal molecules 2 of the liquid crystal panel are oriented so as to twist 240° between the pair off transparent substrates 10, 11. The liquid crystal molecules 2 contain tolan derivative by 65%, and the refractive index anisotropy Δn off the liquid crystal is 0.244. The cell thickness is set to 7.5 μm. Hence, dΔn of liquid crystal cell is 1830 nm.

Furthermore, in this embodiment, the upper polarizer 3 is a polarizer LLC2-56-185F manufactured by Sun Ritz Co., Ltd., and the lower polarizes 4 is a polarizer F3205G manufactured by Nitto Denko Co., Ltd. which is a reflector integrated type polarizer. The phase difference plate 5 is a liquid crystal film of Nippon Petrochemical Co., Ltd. which is a twisted phase difference plate, and the twist angle is 260°, and the twist direction is reverse to the twist direction of the liquid crystal molecules 2. The product $d_R\Delta n_R$ of the refractive index anisotropy $\Delta n_R$ and the thickness $d_R$ of the phase difference plate 5 in this embodiment is 1830 nm.

Figure 15:
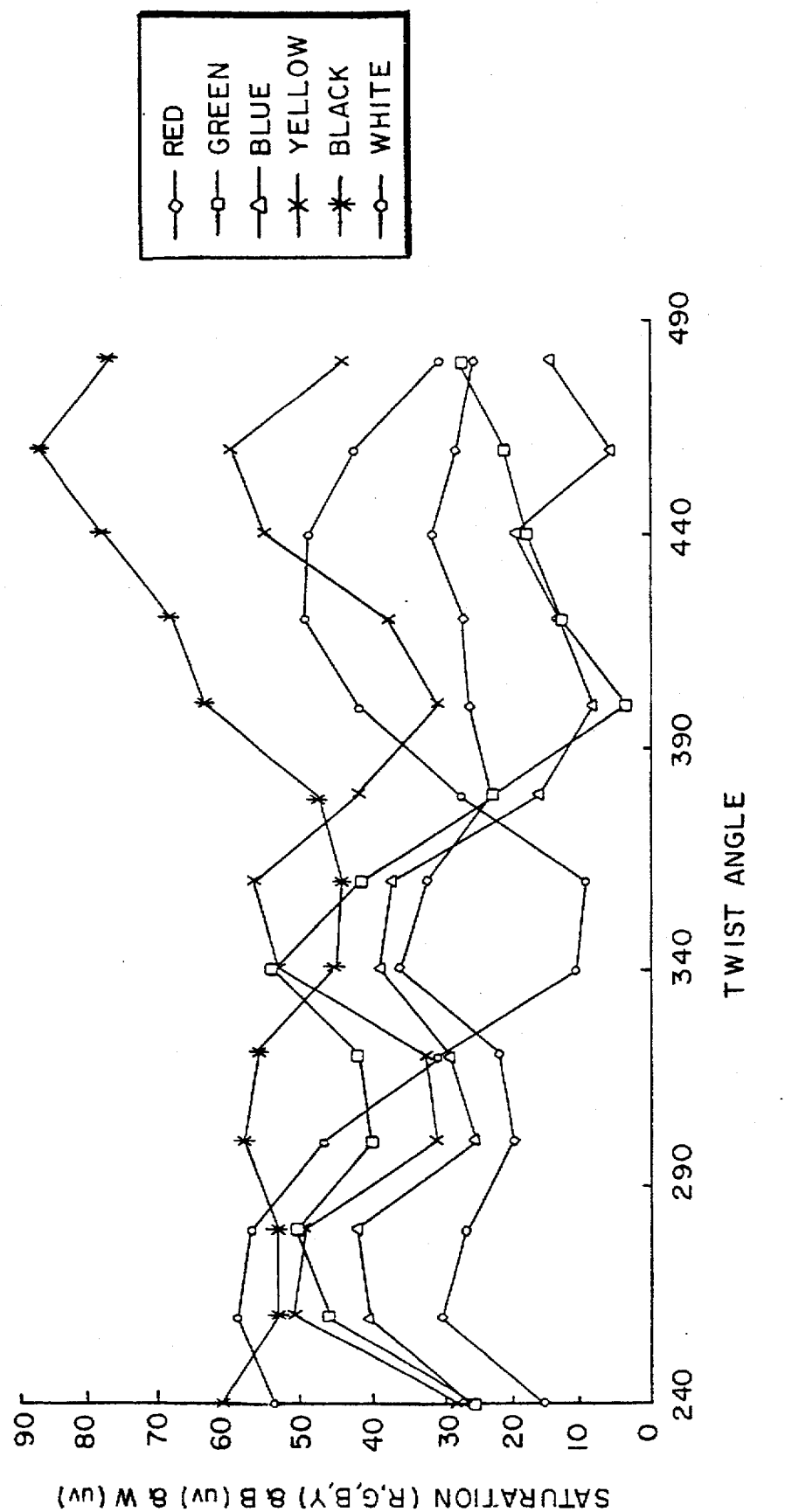
FIG. 15 is a graph showing results of simulation of the relation of twist angles of a twisted phase difference plate to saturations of each color in the case of a twist angle of liquid crystal molecules of 240 degrees.

FIG. 15 shows simulation results of the relation between the twist angle of the twisted phase difference plate 5 and the saturation of each color at twist angle of 240° of liquid crystal molecules 2. As known from the diagram, the twist angle of the twisted phase difference plate 5 should be greater than the twist angle of the liquid crystal molecules 2, and it is known that the saturation of each color is improved when being greater by 1° to 50°, preferably 10° to 40°.

Figure 9A:
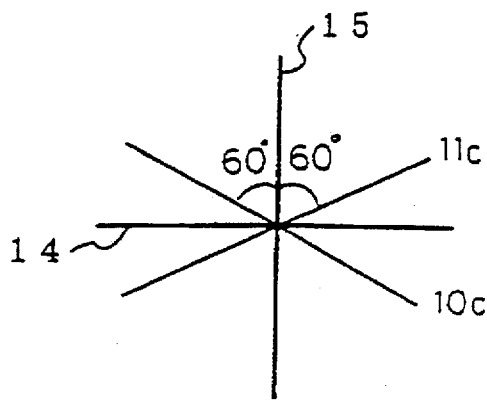
FIGS. 9A to 9C are diagrams showing liquid crystal molecule orientation directions of a liquid crystal cell, absorption axes of a pair of polarizers, and a slow axis of a phase difference plate in a fourth embodiment.
Figure 9B:
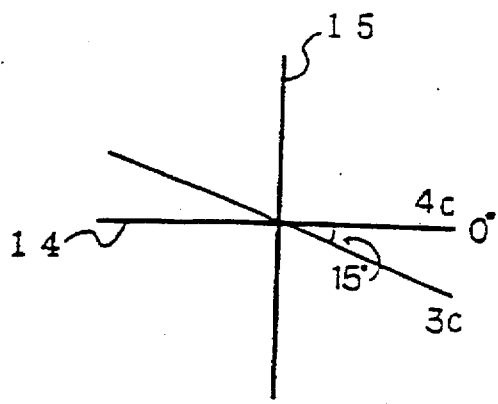
Figure 9C:
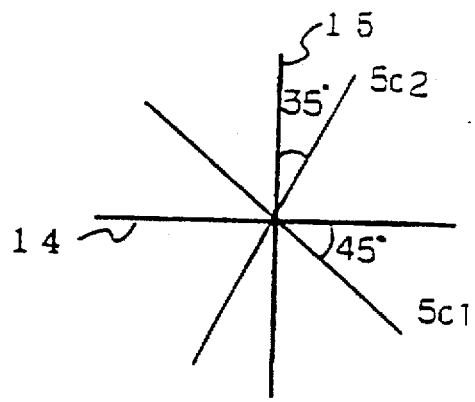

FIGS. 9A to 9C are plan views showing a configuration of orientation directions of the liquid crystal molecules 2, absorption axes of the polarizers 3 and 4, and a slow axis of the phase difference plate 5 of the liquid crystal display device of the embodiment, as seen from the observer, that is, from the upper side in FIG. 1, wherein reference numeral 10c denotes the orientation direction of the liquid crystal molecules 2 on the side of the transparent substrate 10, reference numeral 11c denotes the orientation direction of the liquid crystal molecules 2 at the side of the transparent substrate 11, reference numeral 3c denotes the absorption axis of the upper polarizer 3 and reference numeral 4c denotes the absorption axis of the lower polarizer 4, reference numeral 5c1 denotes the slow axis of the phase difference plate 5 at the side of the upper polarizer 5, and reference numeral 5c2 denotes the slow axis of the phase difference plate 5 at the side of the liquid crystal cell 1. Reference numerals 14 and 15 denotes reference orthogonal axes.

As can be seen from these diagrams, in this embodiment, the crossing angle of the slow axis 5c2 of the phase difference plate 5, and the orientation direction 10c of the liquid crystal molecules 2 on the side adjacent thereto is 85°. The crossing angle of the absorption axis 3c of the upper polarizer 3 and the absorption axis 4c of the lower polarizer 4 is 15°, and the crossing angle of the absorption axis 8c of the upper polarizer 3 and the orientation direction 10c of the liquid crystal molecules 2 at the side adjacent thereto is 30° and, and the crossing angle of the absorption axis 4c of the lower polarizer 4 and the orientation direction 11c of the liquid crystal molecules 2 of the side adjacent thereto is 15°.

Figure 10:
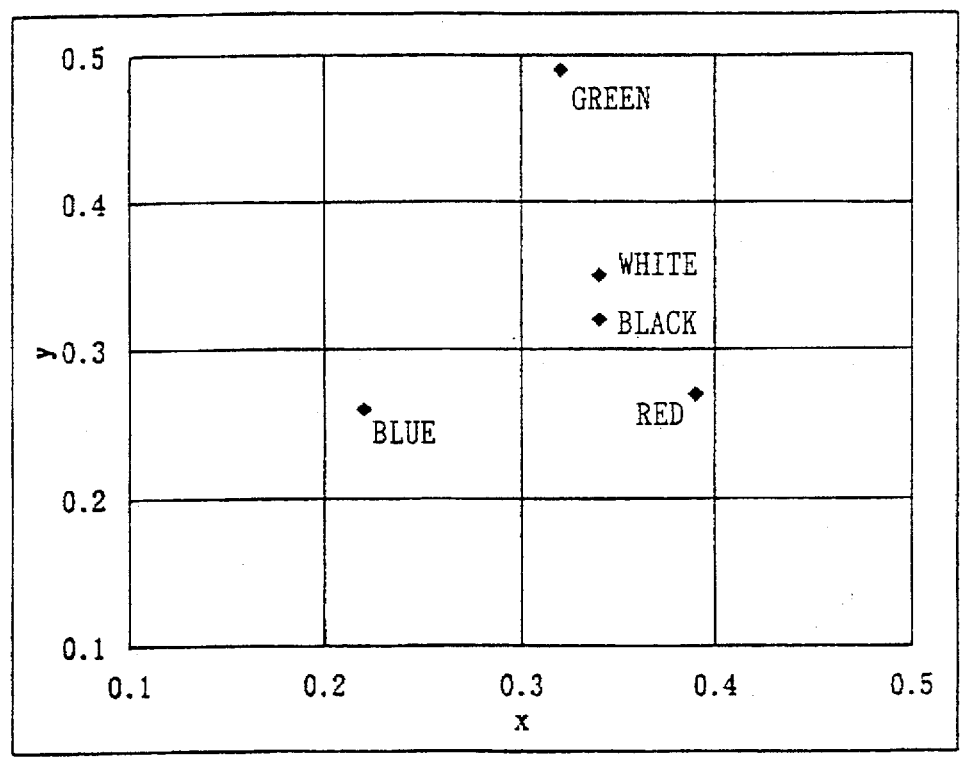
FIG. 10 is a CIE chromaticity diagram in the fourth embodiment.

When such liquid crystal display device was driven by voltage at (1/160) duty and (1/13) bias, and gradation voltages were applied, the orientation of the liquid crystal molecules 2 was changed depending on the applied gradation voltages, and along with this change, as shown in the CIE chromaticity diagram in FIG. 10, colors changed as white, black, blue, green and red, and a color display was enabled in addition to black and white colors. Besides, the orientation direction of the liquid crystal molecules, the slow axis of the phase difference plate, and the absorption axes of the polarizers were optimized, and hence the characteristics of display colors were improved. At the same time, the black and white contrast was enhanced, and a sharp display was realized.

In this embodiment, the twist angle of the liquid crystal molecules is 240°, and this twist angle may be preferred to be selected in a range of 280° to 260°, same as in the first embodiment.

The twist angle of the phase difference plate 5 is set to 260°, which is 20° more than the twist angle of the liquid crystal molecules, and this twist angle of the phase difference plate 5 is preferred to be selected to be larger by 1° to 50° than the twist angle of the liquid crystal molecules. More preferably, it should be selected so as to be larger by 10° to 40°.

Besides, $d\Delta n$ of liquid crystal cell is set to 1830 nm, and this $d\Delta n$ is preferred to be selected in a range of 1700 nm to 1950 nm, the same as in the first embodiment.

Furthermore, at $d_R\Delta n_R$ of 1830 nm, $d\Delta n - d_R\Delta n_R$ is 0 nm, and this $d\Delta n - d_R\Delta n_R$ is preferred to be selected in a range of −150 nm to 150 nm.

The mutual crossing angle off the absorption axes 3c, 4c of the polarizers 3, 4 is 15°, and this crossing angle is preferred to be selected in a range of 5° to 35°.

The crossing angle of the absorption axis 3c of the polarizer 3 and the orientation direction 10c of the liquid crystal molecules 2 adjacent thereto is 30°, and the crossing angle of the absorption axis 4c of the polarizer 4 and the orientation direction 11c of the liquid crystal molecules 2 adjacent thereto is 15°, and these crossing angles are preferred to be selected in a range of 10° to 50°.

The crossing angle of the slow axis 5c2 of the phase difference plate 5 and the orientation direction 10c of the liquid crystal molecules 2 adjacent thereto is 85°, and this crossing angle is preferred to be selected in a range of 80° to 100°.

(Fifth Embodiment)

The constitution of the liquid crystal panel of the birefringence control type liquid crystal display device of a fifth embodiment is similar to the constitution of the fourth embodiment, except that the twist angle of the twisted phase difference plate is 280°, being different from that of the fourth embodiment, and hence the slow axis of the phase difference plate 5 and the absorption axis of the upper polarizer are set in a different way from the counterpart of the fourth embodiment.

Figure 11A:
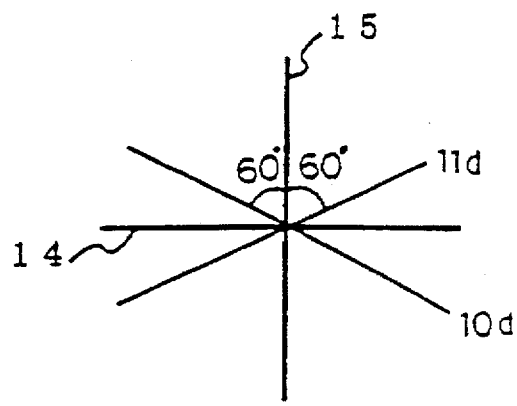
FIGS. 11A to 11C are diagrams showing liquid crystal molecule orientation directions of a liquid crystal cell, absorption axes of a pair of polarizers, and a slow axis of a phase difference plate in a fifth embodiment.
Figure 11B:
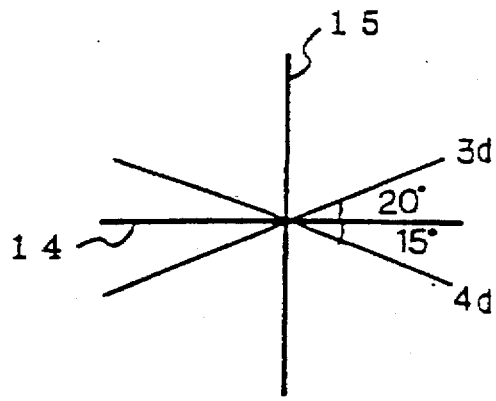
Figure 11C:
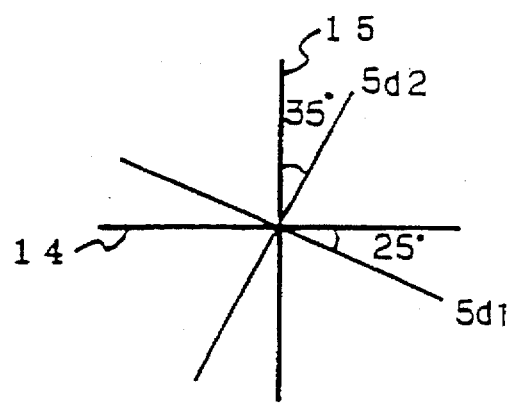

FIGS. 11A to 11C are plan views showing a configuration of orientation directions of the liquid crystal molecules 2, absorption axes of the polarizers 3 and 4, and slow axis of the phase difference plate 5 of the liquid crystal display device of the embodiment, as seen from the observer, that is, from the upper side in FIG. 1, wherein reference numeral 10d denotes the orientation direction of the liquid crystal molecules 2 at the side of the transparent substrate 10, reference numeral 11d denotes the orientation direction of the liquid crystal molecules 2 at the side of the transparent substrate 11, reference numeral 3d denotes the absorption axis of the upper polarizer 3, reference numeral 4d denotes the absorption axis of the lower polarizer 4, reference numeral 5d1 denotes the slow axis of the phase difference plate 5 at the side of the upper polarizer 3, and reference numeral 5d2 denotes the slow axis of the phase difference plate 5 at the side of the liquid crystal cell 1. Reference numerals 14 and 15 denote reference orthogonal axes.

As can be seem from these diagrams, in this embodiment, the crossing angle of the slow axis 5d2 of the phase difference plate 5, and the orientation direction 10d of the liquid crystal molecules 2 on the side adjacent thereto is 85° The crossing angle of the absorption axis 3d of the upper polarizer 3 and the absorption axis 4d of the lower polarizer 4 is 35°, and the crossing angle of the absorption axis 3d of the upper polarizer 3 and the orientation direction 10d of the liquid crystal molecules 2 of the side adjacent thereto is 50°, and the crossing angle of the absorption axis 4d of the lower polarizer 4 and the orientation direction 11d of the liquid crystal molecules 2 of the side adjacent thereto is set to 45°.

When such liquid crystal display device was driven by voltage at (1/120) duty and (1/13) bias, and gradation voltages were applied, the orientation of the liquid crystal molecules 2 was changed depending on the applied gradation voltages, and along with this change, colors changed as white, black, blue, green and red, so that the liquid crystal display device can provide a color display as well as a monochromatic display.

In this embodiment, a twist angle of the liquid crystal molecules, a twist angle of the phase difference plate 5, $d\Delta n$ of the liquid crystal cell, $d_R\Delta n_R$ of the phase difference plate, a mutual crossing angle of the absorption axes 3d, 4d of the polarizers 3 and 4, a crossing angle of absorption axis 3d of polarizer 3 and the orientation direction 10d of the liquid crystal molecules 2 adjacent thereto, a crossing angle of the absorption axis 4d of the polarizer 4 and the orientation direction 11d of liquid crystal molecules 2 adjacent thereto, and a crossing angle of slow axis 5d2 of the phase difference plate 5 and the orientation direction 10d of the liquid crystal molecules 2 adjacent thereto should be preferably selected in the same ranges as in the fourth embodiment. In the subsequent sixth to eighth embodiments, these conditions should be preferably selected in the same ranges as in the fourth embodiment.

(Sixth Embodiment)

The constitution of the liquid crystal panel of the birefringence control type liquid crystal display device according to a sixth embodiment is similar to the counterpart of the fourth embodiment, except that the twist angle of the liquid crystal molecules 2 is 260° and that the twist angle of the twisted phase difference plate 5 is 270°, both being different from those of the fourth embodiment, and hence setting of the slow axis of the phase difference plate and the absorption axis of the upper polarizer is different from that of the fourth embodiment.

Figure 16:
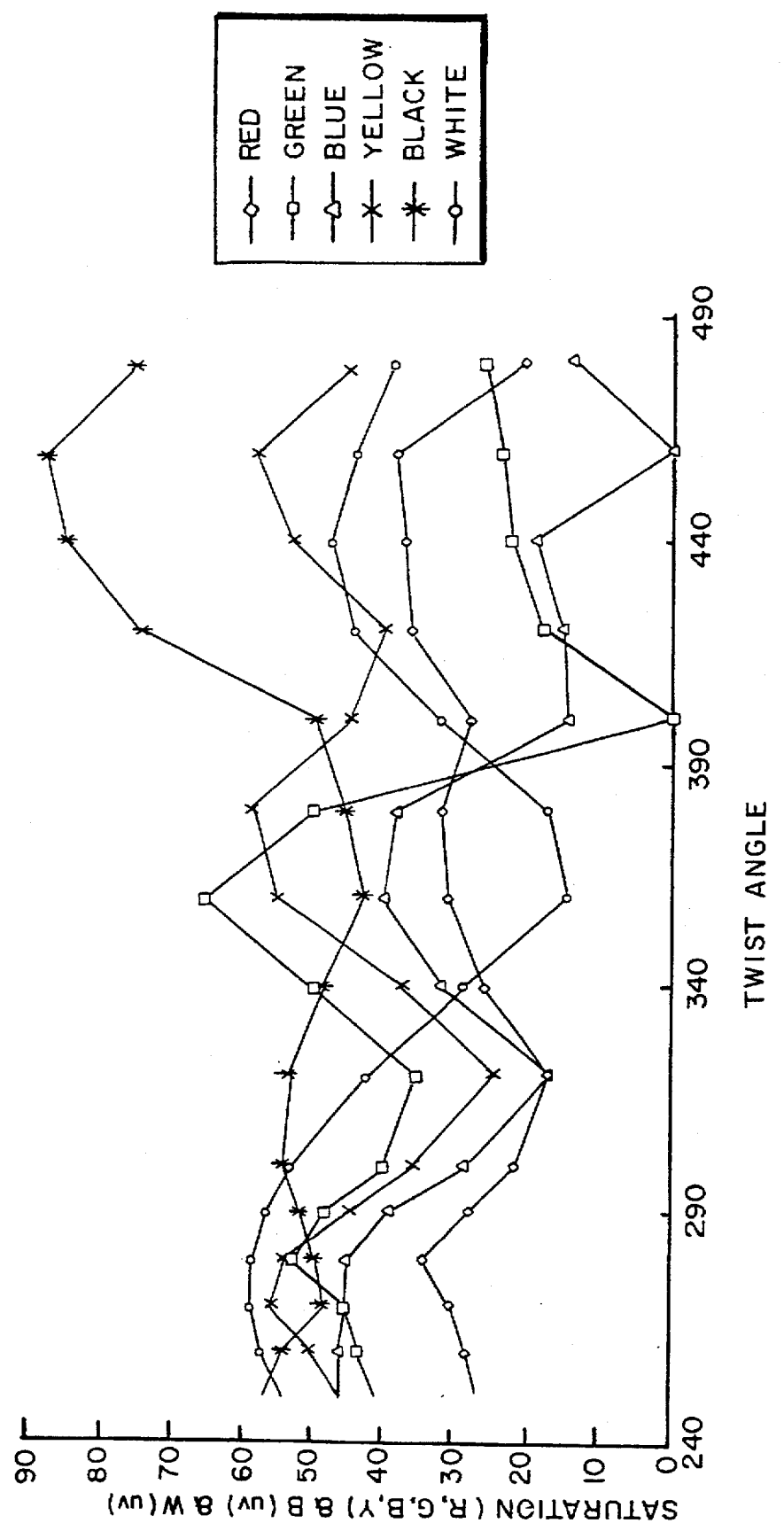
FIG. 16 is a graph showing results of simulation of the relation of twist angles of a twisted phase difference plate to saturations of each color in the case of a twist angle of liquid crystal molecules of 260 degrees.

FIG. 16 shows results of simulation of the relation of twist angles of the twisted phase difference plate 5 to saturations of each color at the twist angle of 260° of liquid crystal molecules 2. As can be seen from the diagram, the twist angle of the twisted phase difference plate 5 should be greater than the twist angle of the liquid crystal molecules 2, and it is known that the saturation of each color is improved when the twist angle of the phase difference plate is greater by 1° to 50°, preferably by 10° to 40°.

Figure 12A:
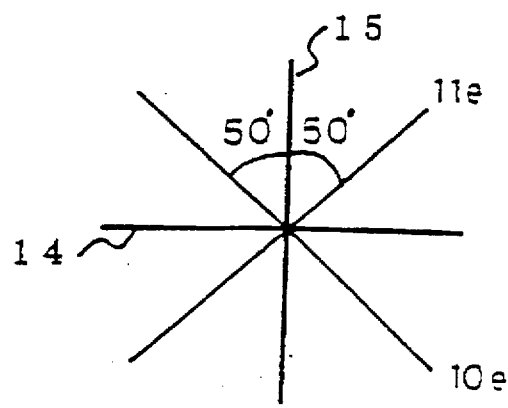
FIGS. 12A to 12C are diagrams showing liquid crystal molecule orientation directions of a liquid crystal cell, absorption axes of a pair of polarizers, and a slow axis of a phase difference plate in a sixth embodiment.
Figure 12B:
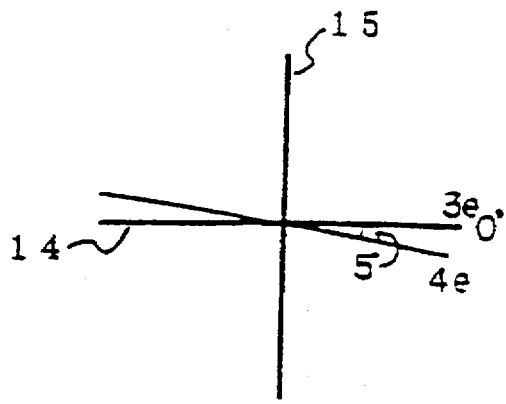
Figure 12C:
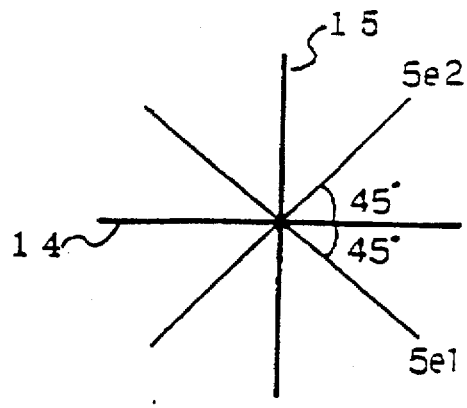

FIGS. 12A to 12C are plan views showing a configuration of orientation directions of the liquid crystal molecules 2, absorption axes of the polarizers 8, 4, and a slow axis of the phase difference plate 5 of the liquid crystal display device of the embodiment, as seen from the observer, that is, from the upper side in FIG. 1, wherein reference numeral 10e denotes the orientation direction of the liquid crystal molecules 2 at the side of the transparent substrate 10, reference numeral 11e denotes the orientation direction of liquid crystal molecules 2 at the side of the transparent substrate 11, reference numeral 8e denotes the absorption axis of the upper polarizer 3, reference numeral 4e denotes is the absorption axis of the lower polarizer 4, reference numeral 5e1 denotes the slow axis of the phase difference plate 5 at the side of the upper polarizer 3, and reference numeral 5e2 denotes the slow axis of the phase difference plate 5 at the side of the liquid crystal cell 1. Reference numerals 14 and 15 denotes reference orthogonal axes.

As can be seen from these diagrams, in this embodiment, the crossing angle of the slow axis 5e2 of the phase difference plate 5, and the orientation direction 10e of the liquid crystal molecules 2 on the side adjacent thereto is 85°, the crossing angle of the absorption axis 3e of the upper polarizer 3 and the absorption axis 4e of the lower polarizer 4 is 5°, the crossing angle of the absorption axis 3e of the upper polarizer 3 and the orientation direction 10e of the liquid crystal molecules 2 on the side adjacent thereto is 40° and the crossing angle of the absorption axis 4e of the lower polarizer 4 and the orientation direction 11e of the liquid crystal molecules 2 of the side adjacent thereto is 45°.

When such liquid crystal display device was driven by voltage at (1/120) duty and (1/13) bias, and gradation voltages were applied, the orientation of the liquid crystal molecules 2 was changed depending on the applied gradation voltages, and along with this change, colors changed as white, black, blue, green and red so that the liquid crystal display provides a color display in addition to black and white colors.

(Seventh Embodiment)

The constitution of the liquid crystal panel of the birefringence control type liquid crystal display device of a seventh embodiment is similar to the counterpart of the fourth embodiment, except that the twist angle of the liquid crystal molecules 2 is 260° and that the twist angle of the twisted phase difference plate 5 is 280°, both being different from those of the fourth embodiment, and hence the slow axis of the phase difference plate and absorption axis of the upper polarizer is set in a different manner from that of the fourth embodiment.

Figure 13A:
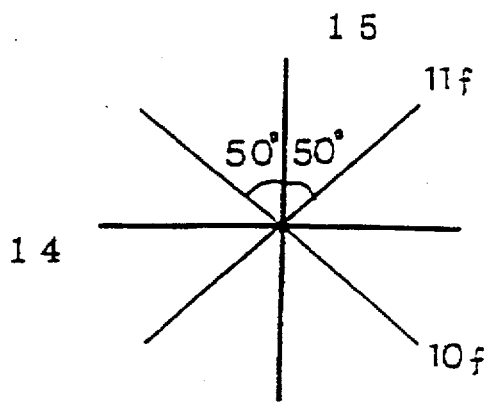
FIGS. 13A to 13C are diagrams showing liquid crystal molecule orientation directions of a liquid crystal cell, absorption axes of a pair of polarizers, and a slow axis of a phase difference plate in a seventh embodiment.
Figure 13B:
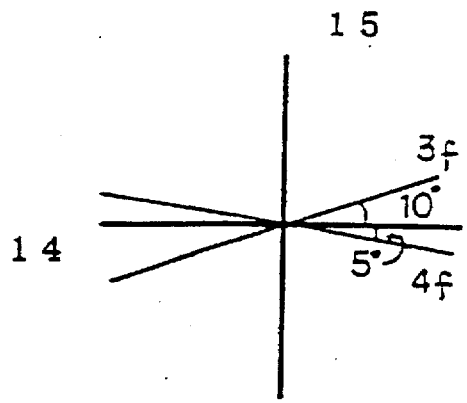
Figure 13C:
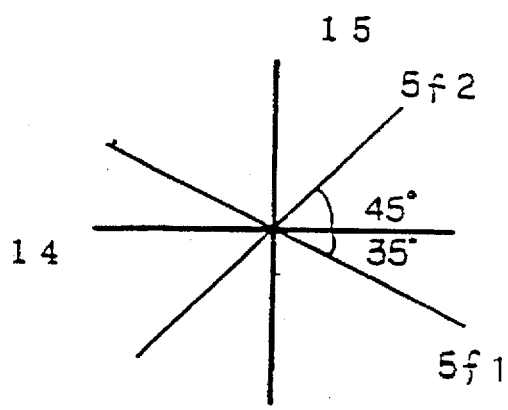

FIGS. 13A to 13C are plan views showing a configuration of orientation directions of the liquid crystal molecules 2, absorption axes of the polarizers 3 and 4, and a slow axis of the phase difference plate 5 of the liquid crystal display device of the embodiment, as seen from the observer, that is, from the upper side in FIG. 1, wherein reference numeral 10f denotes the orientation direction of the liquid crystal molecules 2 at the side of the transparent substrate 10, reference numeral 11f denotes the orientation direction of liquid crystal molecules 2 at the side of the transparent substrate 11, reference numeral 3f denoted the absorption axis of the upper polarizer 3, reference numeral 4f denotes the absorption axis of the lower polarizer 4, reference numeral 5f1 denotes the slow axis of the phase difference plate 5 at the side of the ripper polarizer 3, and reference numeral 5f2 denotes the slow axis of the phase difference plate 5 at the side of the liquid crystal cell 1 side. Reference numerals 14 and 15 denotes reference orthogonal axes.

As can be seen from these diagrams, in this embodiment, the crossing angle of the slow axis 5f2 of the phase difference plate 5, and the orientation direction 10f of the liquid crystal molecules 2 on the side adjacent thereto is 85°, the crossing angle of the absorption axis 3f of the upper polarizer 8 and the absorption axis 4f of the lower polarizer 4 is 15°, the crossing angle of the absorption axis 3f of the upper polarizer 3 and the orientation direction 10f of the liquid crystal molecules 2 of the side adjacent thereto is 50° and the crossing angle of the absorption axis 4f of the lower polarizer 4 and the orientation direction 11f of the liquid crystal molecules 2 of the side adjacent thereto is 45°.

When such liquid crystal display device was driven by voltage at (1/120) duty and (1/13) bias, and gradation voltages were applied, the orientation of the liquid crystal molecules 2 was changed depending on the applied gradation voltages, and along with this change, colors changed as white, black, blue, green and red so that a liquid crystal display device provides a color display in addition to black and white colors.

(Eighth Embodiment)

The constitution of the liquid crystal panel of the birefringence control type liquid crystal display device of an eighth embodiment is almost similar to the constitution of the fourth embodiment, but in this embodiment, since the refractive index anisotropy $\Delta n$ of liquid crystal is set to 0.244 and the cell thickness d is set to 7.258 µm, the d$\Delta n$ of the liquid crystal cell is set to 1770 nm. A phase difference plate having a $d_R \Delta n_R$ of 1875 nm is used as the phase difference plate 5.

An orientation direction of the liquid crystal molecules, a slow axis of the phase difference plate, and absorption axes of upper and lower polarizers are set in the same manner as in the fourth embodiment.

Figure 14:
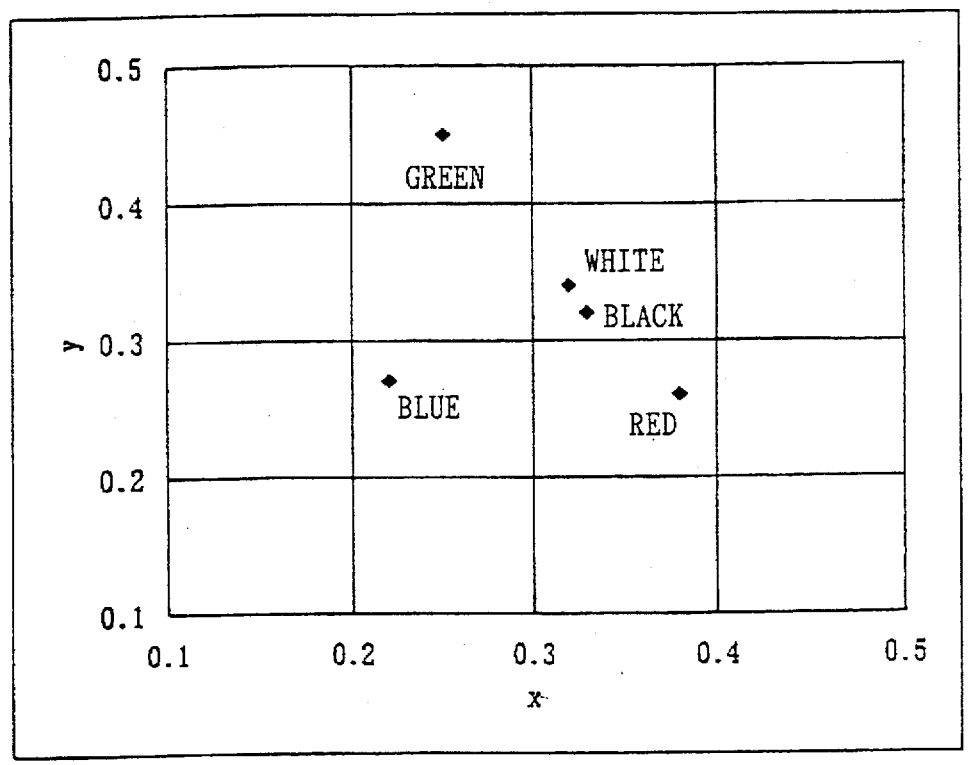
FIG. 14 is a CIE chromaticity diagram in an eighth embodiment.

When such liquid crystal display device was driven by voltage at (1/160) duty and (1/13) bias, and gradation voltages were applied, the orientation of the liquid crystal molecules 2 was changed depending on the applied gradation voltages, and along with this change, colors changed as white, black, blue, green and red as shown in the chromaticity diagram in FIG. 14, and a color display was enabled in addition to black and white colors same as in the fourth embodiment.

In the foregoing embodiments, voltage driving was conducted in the conditions of (1/160) duty and (1/18) bias, or (1/120) duty and (1/18) bias, but these values are not particularly limitative.

Figure 2:
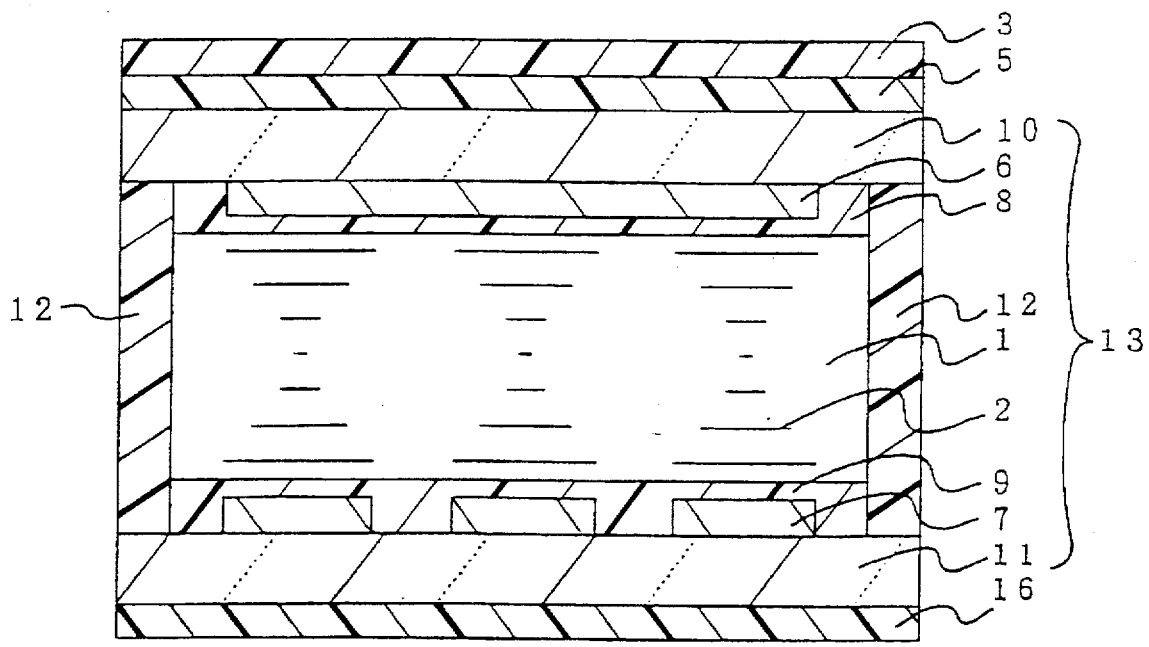
FIG. 2 is a sectional view showing a liquid crystal panel of a liquid crystal display device according to another embodiment of the invention.
Figure 3:
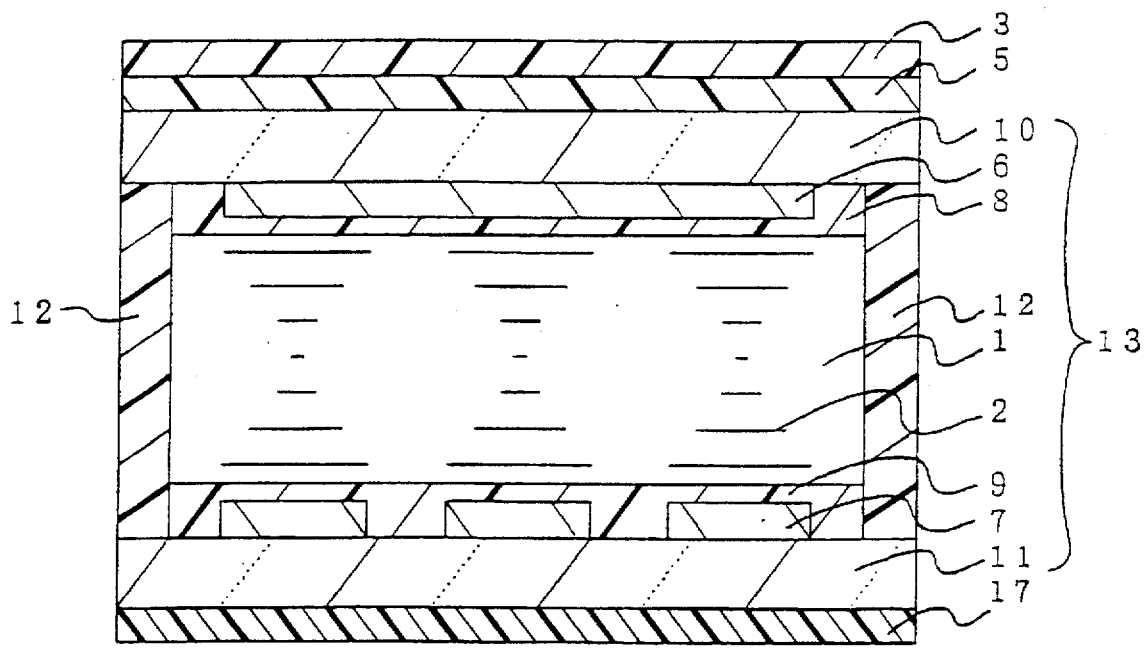
FIG. 3 is a sectional view showing a liquid crystal panel of a liquid crystal display device according to still another embodiment of the invention.

In all the illustrated embodiments, the reflector integrated type polarizer was used as the lower polarizer 4 at the lower side of the liquid crystal cell 13, but the lower polarizer 4 and reflector may be provided separately, or, instead of the reflector integrated type polarizer, a translucent reflector integrated type polarizer 16 as shown in FIG. 2 may be used. When the liquid crystal display device of the invention is used as transmission type, only the polarizer 17 may be used as shown in FIG. S.

Figure 17A:
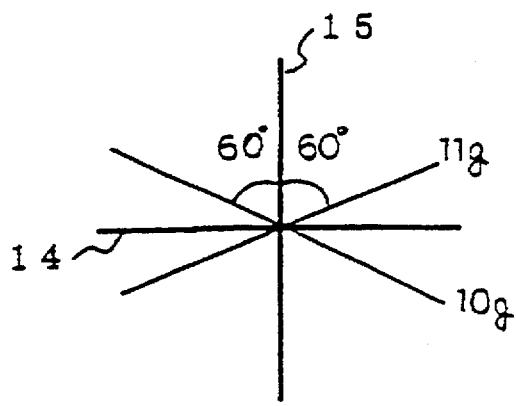
FIGS. 17A to 17C are diagrams showing liquid crystal molecule orientation directions of a liquid crystal cell, absorption axes of a pair of polarizers, and a slow axis of a phase difference plate in a first comparative example.
Figure 17B:
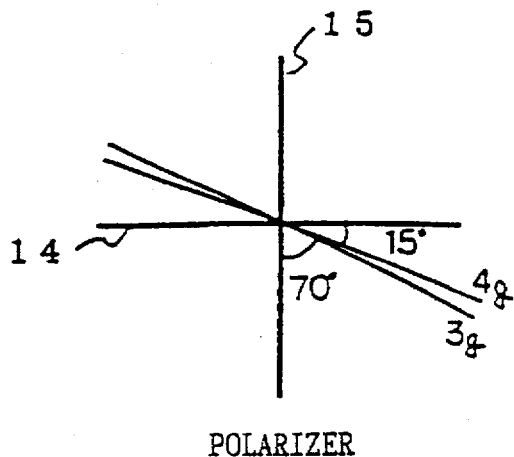
Figure 17C:
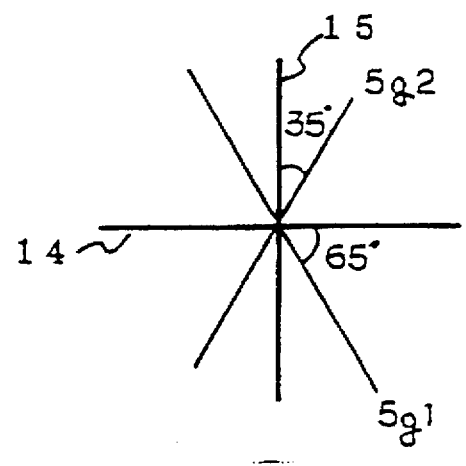

FIGS. 17A to 17C are plan views of a configuration of orientation directions of the liquid crystal molecules 2, absorption axes of the polarizers 3 and 4, and a slow axis of the phase difference plate 5 of the liquid crystal display device of a first comparative example, as seen from the observer, that is, from the upper side in FIG. 1, wherein reference numeral log denotes the orientation direction of the liquid crystal molecules 2 at the side of the transparent substrate 10, reference 11g denotes the orientation direction of the liquid crystal molecules 2 at the side of the transparent substrate 11, reference numeral 3g denotes the absorption axis of the upper polarizer 3, 4g is the absorption axis of the lower polarizer 4, reference numeral 5g1 denotes the slow axis of the phase difference plate 5 at the side of the upper polarizer 3, and reference numeral 5g2 denotes the slow axis of the phase difference plate 5 at the side of the liquid crystal cell 1. Reference numerals 14 and 15 denotes reference orthogonal axes.

Figure 18A:
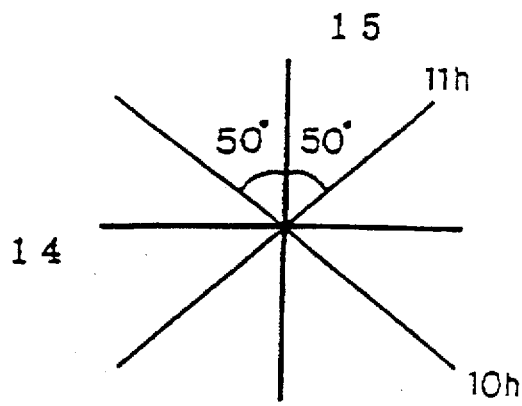
FIGS. 18A to 18C are diagrams showing liquid crystal molecule orientation directions of a liquid crystal cell, absorption axes of a pair of polarizers, and a slow axis of the phase difference plate in a second comparative example.
Figure 18B:
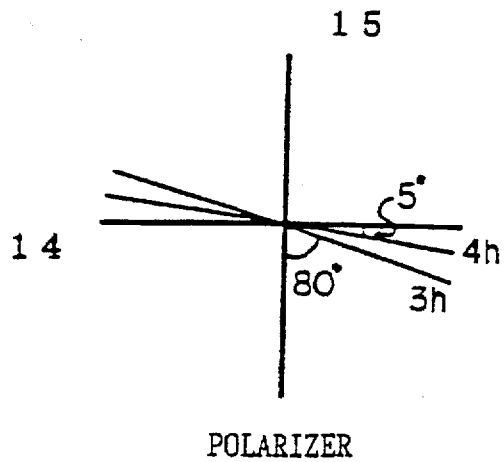
Figure 18C:
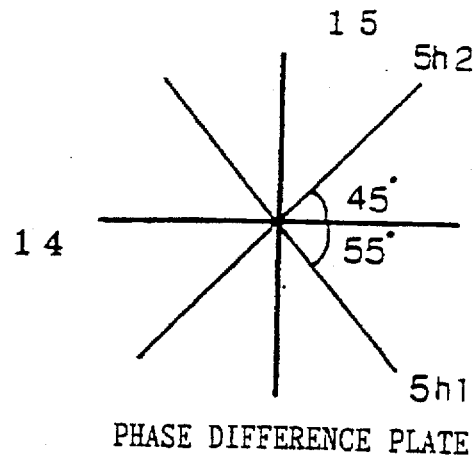

FIGS. 18A to 18C are plan views of configuration showing the orientation direction of liquid crystal molecules 2, absorption axes of polarizers 3 and 4, and slow axis of phase difference plate 5 of the liquid crystal display device according to a second comparative example, as seen from the observer, that is, from the upper side in FIG. 1, wherein reference numeral 10h denotes the orientation direction of the liquid crystal molecules 2 at the side of the transparent substrate 10, reference numeral 11h denotes the orientation direction of liquid crystal molecules 2 at the side of the transparent substrate 11, reference numeral 3h denotes the absorption axis of the upper polarizer 3, reference numeral 4h denotes the absorption axis of the lower polarizer 4, reference numeral 5h1 denotes the slow axis of the phase difference plate 5 at the side of the upper polarizer 3, and reference numeral 5h2 denotes the slow axis of the phase difference plate 5 at the side of the liquid crystal cell 1. Reference numerals 14 and 15 denotes reference orthogonal axes.

A method of evaluating the display characteristics shown in FIG. 15 and FIG. 16 will be described. Saturations R (red), G (green), B (blue), and Y (yellow) on the axis of ordinates are values determined from the values of x, y, z of XYZ display color system shown in "JIS Handbook Colors 1986," and the larger value means the better saturation. Herein, x and y are chromaticity coordinates determined according to JIS Z 8722, and Y is the reflectivity of viewing angle.

The blackness B (u*v*) and whiteness W (u*v*) are calculated in formulas (1) and (2) in conformity with "JIS Handbook Colors 1986" CIE 1976 L,u*v* display color system (JIS Z 8729). Herein, the blackness B (u*v*) represents the degree of being black, and it is an non-colored black at B (u*v*) =100. The whiteness W (u*v*) represents the degree of being white, and it is a non-colored white at W (u*v*) =100.

$$B(\mu^*, v^*)=100-\sqrt{(L^*)^2+(\mu^*)^2+(v^*)^2} \quad (1)$$

$$W(\mu^*, v^*)=100-\sqrt{(100-(L^*)^2)+(\mu^*)^2+(v^*)^2} \quad (2)$$

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A birefringence control type liquid crystal display device comprising:

a liquid crystal cell having an STN type liquid crystal sandwiched by two substrates;

a pair of polarizers disposed so as to sandwich the liquid crystal cell; and a phase difference plate disposed between the pair of polarizers;

wherein the phase difference plate is made of a high polymer film, and a product $\Delta$nd of a refractive index anisotropy $\Delta$n of the STN type liquid crystal and a cell gap d of the liquid crystal cell is in a range of 1700 nm to 1950 nm.

2. The birefringence control type liquid crystal display device of claim 1, wherein the phase difference plate is made of a uniaxially drawn film, and a difference ($\Delta$nd–$\Delta n_R d_R$) between the product $\Delta$nd of the refractive index anisotropy $\Delta$n of the STN type liquid crystal and the cell gap d of the liquid crystal cell, and the product $\Delta n_R d_R$ of a refractive index anisotropy $\Delta n_R$ of and a thickness $d_R$ of the uniaxially drawn film is in a range of 750 nm to 850 nm.

3. The birefringence control type liquid crystal display device of claim 2, wherein the STN type liquid crystal is disposed between the two substrates so that a twist angle of liquid crystal molecules of 230° to 260° is provided, the pair of polarizers sandwiching the liquid crystal cell is disposed so that absorption axes of the polarizers cross each other at an angle of 50° to 70°, and that the absorption axis of each polarizer and an orientation direction of the liquid crystal molecules adjacent to each polarizer cross each other at an angle of 30° to 50°, and the phase difference plate made of the uniaxially drawn film disposed between the pair of polarizers is disposed so that a slow axis of the phase difference plate cross the orientation direction of the liquid crystal molecules adjacent to the phase difference plate at an angle of 80° to 100°.

4. The birefringence control type liquid crystal display device of claim 1, wherein the phase difference plate is made off a uniaxially drawn film, and a difference ($\Delta$nd–$\Delta n_R d_R$) between the product $\Delta$nd of the refractive index anisotropy $\Delta$n of the STN type liquid crystal and the cell gap d of the liquid crystal cell, and the product $\Delta n_R d_R$ of a refractive index anisotropy $\Delta n_R$ of and a thickness $d_R$ of the uniaxially drawn film is in a range of –100 nm to 100 nm.

5. The birefringence control type liquid crystal display device of claim 4, wherein the STN type liquid crystal is disposed between the two substrates so that a twist angle of liquid crystal molecules of 230° to 260° is provided, the pair of polarizers sandwiching the liquid crystal cell is disposed so that absorption axes of the polarizers cross each other at an angle of 10° to 30°, and that the absorption axis of each polarizer and an orientation direction of the liquid crystal molecules adjacent to each polarizer cross each other at an angle of 30° to 50°, and the phase difference plate made of the uniaxially drawn film disposed between the pair of polarizers is disposed so that a slow axis of the phase difference plate cross the orientation direction of the liquid crystal molecules adjacent to the phase difference plate at an angle of 80° to 100°.

6. The birefringence control type liquid crystal display device of claim 1, wherein the phase difference plate is a twisted phase difference plate, and a difference ($\Delta nd - \Delta n_R d_R$) between the product $\Delta nd$ of a refractive index anisotropy $\Delta n$ of the STN type liquid crystal and cell gap d of the liquid crystal cell, and the product $\Delta n_R d_R$ of a refractive index anisotropy $\Delta n_R$ and a thickness $d_R$ of the twisted phase difference plate is in a range of −150 nm to 150 nm.

7. The birefringence control type liquid crystal display device of claim 6, wherein the STN type liquid crystal is disposed between the two substrates so that a twist angle of liquid crystal molecules of 230° to 260° is provided, the pair of polarizers sandwiching the liquid crystal cell is disposed so that the absorption axes of the polarizers cross each other at an angle of 5° to 35°, and that the absorption axis of each polarizer and an orientation direction of the liquid crystal molecules adjacent to each polarizer cross each other at an angle of 10° to 50°, and the twisted phase difference plate disposed between the pair of polarizers is disposed so that a twist angle of a slow axis of the phase difference plate is larger than the twist angle of the liquid crystal molecules by 1° to 50°, that a twist direction of the slow axis is reverse to the twist direction of the liquid crystal molecules, and that a slow axis of the liquid crystal cell side of the phase difference plate crosses the orientation direction of the liquid crystal molecules adjacent to the phase difference plate at an angle of 80° to 100°.

8. The birefringence control type liquid crystal display device of claim 6, wherein the STN type liquid crystal is disposed between the two substrates so that a twist angle of liquid crystal molecules of 230° to 260° is provided, the pair of polarizers sandwiching the liquid crystal cell are disposed so that absorption axes of the polarizers cross each other at an angle of 5° to 35°, and that the absorption axis of each polarizer and an orientation direction of the liquid crystal molecules adjacent to each polarizer cross each other at an angle of 10° to 50°, and the twisted phase difference plate disposed between the pair of polarizers is disposed so that a twist angle of a slow axis of the phase difference plate is larger than the twist angle of the liquid crystal molecules by 10° to 40°, that a twist direction of the slow axis is reverse to the twist direction of the liquid crystal molecules, and that a slow axis of the liquid crystal cell side of the phase difference plate crosses the orientation direction of the liquid crystal molecules adjacent to the phase difference plate at an angle of 80° to 100°.

* * * * *